US012081374B2

(12) United States Patent
Nadal et al.

(10) Patent No.: US 12,081,374 B2
(45) Date of Patent: Sep. 3, 2024

(54) OPTIMISED CIRCULAR CONVOLUTIONS STAGE FOR OS/OSB FBMC RECEIVERS

(71) Applicant: INSTITUT MINES TELECOM, Palaiseau (FR)

(72) Inventors: Jérémy Nadal, Brest (FR); Charbel Abdel Nour, Brest (FR); Amer Baghdadi, Brest (FR)

(73) Assignee: INSTITUT MINES TELECOM, Palaiseau (FR)

( * ) Notice: Subject to any disclaimer, the term of this patent is extended or adjusted under 35 U.S.C. 154(b) by 51 days.

(21) Appl. No.: 17/917,909

(22) PCT Filed: Apr. 6, 2021

(86) PCT No.: PCT/EP2021/058849
§ 371 (c)(1),
(2) Date: Oct. 7, 2022

(87) PCT Pub. No.: WO2021/204750
PCT Pub. Date: Oct. 14, 2021

(65) Prior Publication Data
US 2023/0140597 A1 May 4, 2023

(30) Foreign Application Priority Data

Apr. 10, 2020 (EP) .................................... 20315149

(51) Int. Cl.
*H04L 25/03* (2006.01)
*H04L 27/26* (2006.01)

(52) U.S. Cl.
CPC .... *H04L 25/03159* (2013.01); *H04L 27/2654* (2021.01)

(58) Field of Classification Search
CPC ............ H04L 27/2654; H04L 27/2647; H04L 25/03159; H04L 25/022; H04L 27/26416
See application file for complete search history.

(56) References Cited

U.S. PATENT DOCUMENTS

2014/0233664 A1* 8/2014 Abdoli ................ H04L 27/2634
375/261
2014/0286384 A1* 9/2014 Mestre Pons ....... H04L 27/2654
375/232
(Continued)

FOREIGN PATENT DOCUMENTS

EP 3 236 626 A1 10/2017
EP 3 471 360 A1 4/2019

OTHER PUBLICATIONS

Jeremy Nadal, "Filtered Multicarrier Waveforms in the Context of 5G: Novel Algorithms and Architecture Optimizations", Thesis, Université Bretagne Loire, Jul. 2018 (Year: 2018).*
(Continued)

Primary Examiner — Aristocratis Fotakis
(74) Attorney, Agent, or Firm — BakerHostetler

(57) ABSTRACT

A device configured to perform a stage of circular convolutions in an Overlap-Save Filtered-Bank Multicarrier Communication (OS-FBMC) or Overlap-Save-Block FBMC (OSB-FBMC) receiver and the corresponding method, the stage of circular convolutions comprising P circular convolutions operated between subsets of input samples and frequency domain responses of a frequency shifted version of a prototype filter associated to an FBMC modulation having $C_g$ coefficients, with P an integer greater than one, the device comprising at least one Finite Impulse Response filter implemented in the form of a transposed direct filter having at least $C_g - 1$ taps numbered $p = -\Delta + 1$ to $p = \Delta$ with $$\Delta = \frac{c_g - 1}{2},$$

wherein the multiplier coefficient of each tap p within the set of taps $[\![-\Delta+1; 0]\!]$ has an equal absolute value to the
(Continued)

multiplier coefficient of tap (1−p). An FBMC equalization and demodulation unit or an FBMC receiver comprising the device.

19 Claims, 12 Drawing Sheets

(56) References Cited

U.S. PATENT DOCUMENTS

| | | | |
|---|---|---|---|
| 2016/0197758 A1* | 7/2016 | Lin | H04L 27/2654 |
| | | | 370/210 |
| 2016/0211999 A1* | 7/2016 | Wild | H04L 25/0204 |
| 2017/0331647 A1* | 11/2017 | Abdelghaffar | H04L 25/03006 |
| 2018/0139080 A1* | 5/2018 | Kim | H04L 1/1867 |
| 2022/0014217 A1* | 1/2022 | Luo | H04L 1/0057 |

OTHER PUBLICATIONS

Nadal et al, Overlap-Save FBMC Receivers, IEEE Transactions On Wireless Communications, vol. 19, No. 8, Aug. 2020 (Year: 2020).*

Okano et al, Overlap-Windowed-DFTs-OFDM with Overlap FFT Filter-Bank for Flexible Uplink Access in 5G and Beyond, Ibaraki University, Japan, IEEE, 2018 (Year: 2018).*

Bellanger, "Fs-Fbmc: an alternative scheme for filter bank based multicarrier transmission", Proceedings of the 5th International Symposium on Communications, Control and Signal Processing, ISCCSP 2012.

Nadal, et al., "A block FBMC receiver designed for short filters", IEEE International Conference on Communications (ICC), May 2018.

* cited by examiner

OPTIMISED CIRCULAR CONVOLUTIONS STAGE FOR OS/OSB FBMC RECEIVERS

CROSS-REFERENCE TO RELATED APPLICATIONS

This application is a National Stage of International patent application PCT/EP2021/058849, filed on Apr. 6, 2021, which claims priority to foreign European patent application No. EP 20315149.3, filed on Apr. 10, 2020, the disclosures of which are incorporated by reference in their entirety.

FIELD OF THE INVENTION

The present invention relates generally to 5G (Fifth Generation) standards for wireless communications, and more specifically aims at reducing the processing power required by a specific implementation of a filtered-bank multicarrier communication (FBMC) receiver.

BACKGROUND PRIOR ART

Forthcoming mobile communication systems are foreseen to provide ubiquitous connectivity and seamless service delivery in all circumstances. The large number of devices and the coexistence of human-centric and machine type applications expected will lead to a large diversity of communication scenarios and characteristics. In this context, many advanced communication techniques are under investigation.

Among those techniques, one is based on filter-bank multicarrier communications (FBMC) principles. FBMC transmission techniques are based on the well-known Orthogonal Frequency-Division Multiplexing transmission techniques (OFDM), where the samples to transmit are modulated and mapped over different subcarriers, and then transposed in the time domain by an inverse Fast Fourier Transform (IFFT), and include an additional stage of filtering the signal by a prototype filter.

In FBMC, a group of M samples to transmit is first oversampled by a factor K, and then filtered by a filter called prototype filter, to give an FBMC symbol of a size $L=KM$, where M corresponds to the total number of subcarriers allocated to the transmission, comprising useful subcarriers dedicated to the mapping of the data symbols, pilot subcarriers, guard subcarriers, and zero-padded (not-used) subcarriers. The length of the prototype filter is equal to the length of an FBMC symbol, i.e. L. So that the transmission throughput is not reduced due to the oversampling, subsequent FBMC symbols are not transmitted consecutively, but are summed after being delayed by M samples: this process is called overlapping. As in OFDM, the FBMC symbols are transposed to the time domain, either before or after the oversampling and filtering stages. As a result of this processing, in particular the filtering and overlapping stages, there is no orthogonality and no cyclostationarity in the transmitted symbols.

FBMC modulations outperform OFDM modulations on various aspects: they present lower out-of-band power leakages as there are no sudden transitions between FBMC symbols thanks to the filtering by the prototype filter, a higher intrinsic robustness to multipath reflections thanks to the repetition and to the prototype filtering, and a higher throughput as no cyclic prefixes insertion is required and as lower guard frequency bands are required due to the better spectral shape. However, the drawback of FBMC modulations lies in the absence of complex orthogonality which means that, at a given time, the signal received is the result of K overlapping symbols combined with the effect of the filtering. Therefore, implementing an equalizer to mitigate severe multipath propagation channels is of a high complexity, unlike in OFDM.

In order to bring some orthogonality between subcarriers, a modulation scheme named FBMC with Offset-Quadrature Amplitude Modulation (FBMC/OQAM, also known as OFDM/OQAM or staggered modulated multi-tone-SMT) is known. This scheme is being studied and considered as a key enabler for the future flexible 5G air interfaces. In what follows, unless otherwise mentioned, the OQAM modulation scheme will be considered. However, the invention shall not be limited to FBMC/OQAM schemes as it will be easily adapted by the one skilled to another modulation, like FBMC with QAM modulation or any other modulation.

In FBMC/OQAM, prior to the repeating and filtering stages, the real part of the samples to transmit is mapped over one in two subcarriers, both in time and in frequency. The imaginary part of the samples to transmit is delayed by M/2 and mapped over the other subcarriers, like in a checker board pattern. An appropriate prototype filter preserving the subcarriers orthogonality is used. As the subcarriers now show some orthogonality, it is possible to implement a low cost frequency domain equalizer on the receiver side, similarly to what is done in OFDM. European patent application EP 3.236.626 A1 describes a method to compute short prototype filters with good performances.

Various implementations of FBMC/OQAM transmitters/receivers are known to the person skilled in the art, as for instance the PolyPhase Network implementation (PPN/OQAM), where the signal is transposed in the time domain prior to the oversampling and filtering stages, or the Frequency Spread implementation (FS/OQAM), described in M. Bellanger, "FS-FBMC: an alternative scheme for filter bank based multicarrier transmission", Proceedings of the $5^{th}$ International Symposium on Communications, Control and Signal Processing, ISCCSP 2012, Rome, Italy, 2-4 May 2012, where the signal is transposed in the time domain after the oversampling and filtering stages. The signals produced by each of these implementations are similar, except for rounding errors.

On the receiver side, the reverse operations are performed. Equalization is performed in the frequency domain, as it is far less complex than in the time domain. In a receiver according to the PPN implementation, the signal is filtered, downsampled and then transposed into the frequency domain. Therefore, the prototype filter impulse response convolutes with the propagation channel impulse response, which makes the equalization process highly complex and not efficient.

A receiver according to the FS-FBMC implementation scheme is more adapted to signal equalization, as equalization is performed over the upsampled signal, prior to the prototype filtering and downsampling stages. In the FS-FBMC receiver, the propagation channel does not convolute with the prototype filter, and can therefore be achieved with a limited complexity. However, the FS-FBMC receiver is not efficient when employed with short prototype filters. Therefore, a time-domain equalization must be performed over a segment of signal comprising all the contributions of the reflected paths, that is to say of a portion of signal which is equal to the FBMC symbol plus an additional part the size of which depends on the length of the equalizer. Thus, a Fast Fourier Transform (FFT) of a size $N=PL$ must be processed to transpose the signal into the frequency domain before equalization, with $P>1$. An Inverse Fast Fourier Transform (IFFT) of a size N is required to transpose back the signal into the time domain, and a new FFT of a size L=KM shall be processed to retrieve an equalized signal into the frequency domain, which is followed by a prototype filtering and a downsampling. Consequently, three FFT/IFFT have to be computed in serial, resulting in a high implementation cost. In addition, such an implementation is bonded to the size of the prototype filter impulse response, and do not present the flexibility that is expected from 5G communication standards in terms of latencies, dynamic subcarriers management, robustness, etc.

To address the above issue, the applicant has filed European patent application published under number EP 3.471.360 A1, herein incorporated by reference, wherein the above described drawbacks of the previous art are related in more details. The patent application proposes new FBMC/OQAM receivers implementations. One of them, known as the Overlap-Save FBMC receiver (OS-FBMC), is adapted to process FBMC symbols one by one. Another implementation, known as the Overlap-Save-Block FBMC receiver (OSB-FBMC), is adapted to process multiple FBMC symbols in parallel. These implementations have been made available to the public through the publication: J. Nadal, F. Leduc-Primeau, C. Abdel Nous, and A. Baghdadi, "A block FBMC receiver designed for short filters", IEEE International Conference on Communications (ICC), May 2018.

FIGS. 1a, 1b and 1c represent exemplary embodiments of an FBMC receiver as disclosed in EP 3.471.360. FIG. 1a relates to an OS-FBMC receiver implementation for the processing of the FBMC symbol #n, FIG. 1b relates to an OSB-FBMC receiver implementation for the parallel processing of FBMC symbols #1 to #7, while FIG. 1c relates to an OS-FBMC receiver implementation wherein the subcarriers are allocated to multiple transmitters (user 0 to user u). In each embodiment, P is an integer greater than one.

In the embodiment of FIG. 1a, the received signal is processed through an FFT 101 of a size N=PL. The value of P is chosen so as select of portion of signal which is higher than an FBMC symbol, but as low as possible (typically, P=2 or P=4). A frequency domain equalization 102 is performed over the output of FFT 101. Each equalized samples is input to one among P circular convolution modules (modules 103 and 104 in the exemplary illustration of FIG. 1a) operating in parallel. Each circular convolution is therefore of a size KM. Respective outputs of the P circular convolutions are added (105) and downsampled (106).

Circular convolution number/convolutes the equalized samples with a specific sequence $G_l$ calculated from the prototype filter g:

$$G_l(p) = \sum_{k=0}^{L-1} g(k)z_l(k)e^{-i\frac{2\pi pk}{L}} \quad \text{Eq. 1}$$

with $$z_l(k) = e^{i\frac{2\pi l(k-L/2)}{P}}$$

a linear phase rotation term.

It is noted that, in order to simplify the understanding of the following calculations, the samples that input each circular convolution are numbered between $-L/2$ and $L/2$, contrary to what is done in EP 3.471.360, where they are numbered between 0 and L. This convention has been adopted to make easier to understand the calculations exploiting the symmetrical properties of the circular convolutions, as explained in more details further below.

The embodiment of FIG. 1b is very close to the one of FIG. 1a, with P chosen so that the initial FFT 101 processes a signal which comprises multiple FBMC symbols. In the illustrative example of FIG. 1b, P is chosen higher than or equal to four, so that seven FBMC/OQAM symbols are processed by the initial FFT 101.

A stage 110 of applying a linear phase rotation to the frequency domain samples is added between FFT 101 and the circular convolution modules 103 and 104. This stage can be merged with the equalization stage 102 applying a phase rotation 111 corresponding to these two stages.

In the embodiment of FIG. 1c, the subcarriers are allocated to multiple users. In this embodiment, a group of $L_u$ subcarriers is allocated to each user u. Each user can have a different prototype filter, number of allocated subcarriers or oversampling factor. Therefore, the value of P is chosen so that N, the size of the initial FFT, is an integer multiple of each $L_u$. In this embodiment, subcarriers allocated to each user are processed independently during the stages of frequency domain equalization (120, 121), circular convolution (122-123, 124-125), summing (126, 127) and downsampling (128, 129).

The previous embodiments of an FBMC receiver make possible to receive, equalize and demodulate a FBMC signal with:
- a limited complexity, as only one FFT is required, and as multiple FBMC symbols may be processed at a same time,
- a high reconfigurability, as modifying the prototype filter's size only requires updating the sequences used in the circular convolutions as long as the size of the prototype filter is a submultiple of N,
- a high flexibility, as multiple users can be managed.

Samples $Y_l$ that output the circular convolution module number l, with $l \in [\![0,P-1]\!]$, can be expressed as follows:

$$Y_l(m) = \sum_{p=-\frac{L}{2}}^{\frac{L}{2}-1} G_l(p)X_l(\text{mod}_N(m-p)) \quad \text{Eq. 2}$$

where $\text{mod}_N(.)$ is the modulo N operator, $X_l$ is the set of samples that input circular convolution module number l, and $Y_l$ is the set of samples that output circular convolution module number l. For instance, with regard to the illustrations of FIG. 1a, $X_l=[X(l), X(l+P), X(l+2P), \ldots, X(l+(M-1)P)]$.

In practice, due to the frequency localization of the prototype filter, the subcarriers located at the extreme edges of the spectrum of the frequency domain transform of the prototype filter are zero-padded, to limit the attenuation of the low pass-filter in the analog domain. Thus, the circular convolution can be replaced by a linear convolution, and Eq. 2 rewritten as:

$$Y_l(m) = \sum_{p=-\frac{L}{2}}^{\frac{L}{2}-1} G_l(p)X_l(m-p). \quad \text{Eq. 3}$$

Due to the frequency localization of the prototype filter, the number $C_g$ of coefficients required to perform a circular convolution can be limited, which reduces the implementation complexity by avoiding unnecessary calculations. For instance, using the well-known NPR1 PF (acronym for Nearly Perfect Reconstruction Prototype Filter), a residual interference of 45 dB is obtained considering a number of coefficients $C_g=7$. Therefore, signal $Y_l$ that outputs circular convolution number 1 becomes:

$$Y_l(m) = \sum_{p=-\Delta}^{\Delta} G_l(p) X_l(m-p), \quad \text{Eq. 4}$$

where $$\Delta = \frac{C_g - 1}{2}.$$

The complexity of me circular convolutions stage in an OS/OSB-FBMC receiver therefore mainly depends on the number $C_g$ of significant coefficients of the frequency domain response $G_l$ of the prototype filter. The number $C_g$ of significant coefficients is an implementation choice resulting of a compromise between performances and implementation cost. The significant coefficients are the coefficients of the impulse reponse having the highest value. Typically, the number of significant coefficients $C_g$ is chosen as an odd number, the impulse response of a FIR filter being generally symmetrical around the maximum value.

Implementing Eq. 4 can be easily achieved using a set of P Finite Impulse Response filter (FIR) of a size $C_g$, each filter corresponding to a value of l. The number of multiplications required to perform circular convolutions 103, 104 equals $4PC_g$ per sample. By comparison, computing FFT 101 in an OS/OSB-FBMC receiver requires $\lceil \log_4(PL) - 1 \rceil$ multiplications per sample, using known efficient hardware architectures to implement the FFT, $\lceil . \rceil$ being the ceiling operator. Assuming L=512, P=4, and $C_g=7$, which are typical parameters for 4G/5G & NPR1 filter, each sample that is output to the FFT stage 101 requires 16 multiplications, while each sample that is output the circular convolutions stage (103, 104) requires 112 multiplications, which is six time higher.

The implementation complexity, whether the implementation is done over an FPGA device (acronym for Field Programmable Gate Array), an ASIC (Application Specific Integrated Circuit), a DSP (acronym for Digital Signal processor) or any other suitable software/hardware device, mainly relates to the number of multipliers required. There is therefore a need for a solution that reduces the complexity and implementation cost of the circular convolutions stage in an OS/OSB-FBMC receiver.

SUMMARY OF THE INVENTION

It is an object of the invention to provide improvements over the prior art with a device and associated method relative to a circular convolutions stage in an OS/OSB-FBMC receiver, where the implementation complexity is reduced with regard to the prior art. To this end, the current disclosure exploits multiple properties relative to the FBMC/OQAM modulation making it possible to reduce the number of operation required, in particular the number of multiplications.

To this effect is disclosed a device configured to perform a stage of circular convolutions in an Overlap-Save Filtered-Bank Multicarrier Communication (OS-FBMC) or Overlap-Save-Block FBMC (OSB-FBMC) receiver. The stage of circular convolutions comprises P circular convolutions operated between subsets of input samples and frequency domain responses of a frequency shifted version of a prototype filter associated to an FBMC modulation having $C_g$ coefficients, with P an integer greater than one. The device comprises at least one Finite Impulse Response (FIR) filter implemented in the form of a transposed direct filter having at least $C_g-1$ taps numbered $p=-\Delta+1$ to $p=\Delta$ with $$\Delta = \frac{C_g - 1}{2},$$

wherein the multiplier coefficient of each tap p within the set of taps $[\![-\Delta+1; 0]\!]$ has an equal absolute value to the multiplier coefficient of tap $(1-p)$, that is that the two multiplier coefficients are equal or that they have a same absolute value but different signs.

According to an embodiment, the device comprises a first FIR filter implemented in the form of a transposed direct filter having $C_g$ taps numbered $p=-\Delta$ to $p=\Delta$. The first FIR filter takes as input the subset of input samples $X_0=[X(0), X(0+P), X(2P), \ldots, X((KM-1)P)]$, with M a number of carriers allocated to a FBMC signal and K an oversampling factor of the FBMC modulation. The multiplier coefficients of taps $p=-\Delta$ to $-1$ and respectively the multiplier coefficient of each tap p within the set of taps $[\![-\Delta; -1]\!]$ has an equal value to the multiplier coefficient of tap $(-p)$.

According to an embodiment where P is even, the at least one FIR filter of the device comprises a second FIR filter implemented in the form of a transposed direct filter having at least $C_g-1$ taps numbered $p=-\Delta+1$ to $p=\Delta$. The second FIR filter takes as input the subset of input samples $X_{P/2}=[X(P/2), X(P/2+P), X(P/2+2P), \ldots, X(P/2+(KM-1)P)]$, with M a number of carriers allocated to a FBMC signal and K an oversampling factor of the FBMC modulation. The multiplier coefficient each tap p within the set of taps $[\![-\Delta+1; 0]\!]$ has an opposite value to the multiplier coefficient of tap $(1-p)$.

The coefficients of the first and/or second FIR filters are the $C_g$ significant coefficients of:

$$G_l(p) = \sum_{k=0}^{L-1} g(k) z_l(k) e^{-j\frac{2\pi pk}{L}},$$

where g is the time domain response of the prototype filter and $$z_l(k) = e^{j\frac{2\pi l(k-L/2)}{P}},$$

with l=0 for the first FIR filter, and l=P/2 for the second FIR filter.

According to some embodiments, the at least one FIR filter of the device comprises a partial summation unit configured to take as input subsets of input samples $X_l$ and $X_{P-l}$, with $X_l=[X(l), X(l+P), X(l+2P), \ldots, X(l+(KM-1)P)]$ and $X_{P-l}=[X(P-l), X(P-l+P), X(P-l+2P), \ldots, X(P-l+(KM-1)P)]$, M being a number of carriers allocated to a FBMC signal and K an oversampling factor of the FBMC modulation, $l \in [\![ 1, P/2-1 ]\!]$. The partial summation unit comprises:

one or more calculation unit configured to calculate a set of samples equal to $X_l - X_{P-l}$ and a set of samples equal to $X_l + X_{P-l}$;

a first FIR sub-filter implemented in the form of a transposed direct filter having at least $C_g - 1$ taps numbered $p = -\Delta + 1$ to $p = \Delta$. The first FIR sub-filter takes as input the set of samples $X_l - X_{P-l}$. The multiplier coefficient of each tap p within the set of taps $[\![ -\Delta + 1; 0 ]\!]$ has an equal value to the multiplier coefficient of tap $(1-p)$;

a second FIR sub-filter implemented in the form of a transposed direct filter having at least $C_g - 1$ taps numbered $p = -\Delta + 1$ to $p = \Delta$. The second FIR sub-filter takes as input samples $X_l + X_{P-l}$. The multiplier coefficient of each tap p within the set of taps $[\![ -\Delta + 1; 0 ]\!]$ has an opposite value to the multiplier coefficient of tap $(1-p)$; and a calculation unit configured to sum and divide by a factor two corresponding outputs of the first and second FIR sub-filters.

The coefficients of the first FIR sub-filter are the $C_g$ significant coefficients of $R_l(p) = G_l(p) + G_l(1-p)$, with:

$$G_l(p) = \sum_{k=0}^{L-1} g(k) z_l(k) e^{-i\frac{2\pi pk}{L}},$$

where g is the time domain response of the prototype filter and $$z_l(k) = e^{i\frac{2\pi l(k-L/2)}{P}}.$$

The coefficients of the second FIR sub-filter are the $C_g$ significant coefficients of $S_l(p) = G_l(p) - G_l(1-p)$.

According to an embodiment, the device comprises $$\frac{P-2}{2}$$

partial summation units when P is even, or $$\frac{P-1}{2}$$

partial summation units when P is odd.

Advantageously, taps of a FIR filter or FIR sub-filter having multiplier coefficients with equal absolute values share a multiplier resource.

According to an embodiment, FIR filters or FIR sub-filters having multipliers coefficients of opposite value comprise means to calculate the opposite of an output of the said shared multiplier resource.

Advantageously, the multiplier coefficients of the FIR filters and FIR sub-filters are real and implemented in the form of networks of constant multipliers.

The disclosure further concerns an FBMC equalization and demodulation unit configured to process an FBMC signal comprising FBMC symbols, each FBMC symbol comprising data mapped over M subcarriers, oversampled by a factor K, filtered by a prototype filter and transposed in the time-domain. The FBMC equalization and demodulation unit comprises:

a frequency domain transposition unit, configured to transpose a block of P*KM samples comprising at least one FBMC symbol into frequency domain samples, where P is an integer greater than one, an equalizer unit configured to output a set of equalized samples X by multiplying said frequency domain samples by coefficients computed from a propagation channel estimate, a device configured to perform a stage of circular convolutions comprising P circular convolutions operated between subsets of input samples and frequency domain responses of a frequency shifted version of a prototype filter associated to an FBMC modulation having $C_g$ coefficients, with P an integer greater than one. The device comprises at least one FIR filter implemented in the form of a transposed direct filter having at least $C_g - 1$ taps numbered $p = -\Delta + 1$ to $p = \Delta$ with $$\Delta = \frac{C_g - 1}{2}.$$

The multiplier coefficient of each tap p within the set of taps $[\![ -\Delta + 1; 0 ]\!]$ of the FIR filter has an equal value to the multiplier coefficient of tap $(1-p)$, and adders (105), configured to sum corresponding outputs of each of the said FIR filters.

The disclosure also concerns an FBMC receiver comprising an FBMC equalization and demodulation unit as described hereabove.

The disclosure also concerns a method to perform P circular convolutions in an OS/OSB-FBMC receiver between subsets of input samples and frequency domain responses of a frequency shifted version of a prototype filter associated to an FBMC modulation having $C_g$ coefficients, P being an integer greater than one. The method comprises the filtering of a subset of samples that are input to the circular convolutions stage through a transposed direct FIR filter having at least $C_g - 1$ taps numbered $p = -\Delta + 1$ to $p = \Delta$ with $$\Delta = \frac{C_g - 1}{2},$$

the multiplier coefficient of each tap p within the set of taps $[\![ -\Delta + 1; 0 ]\!]$ has an equal absolute value to the multiplier coefficient of taps $(1-p)$.

Finally, the disclosure comprises a computer program adapted to implement the method described hereabove, and a computer readable medium incorporating the computer program.

BRIEF DESCRIPTION OF THE DRAWINGS

The invention will be better understood and its various features and advantages will emerge from the following description of a number of exemplary embodiments and its appended figures in which.

The examples disclosed in this specification are only illustrative of some embodiments of the invention.

DETAILED DESCRIPTION OF THE INVENTION

Figure 2A:
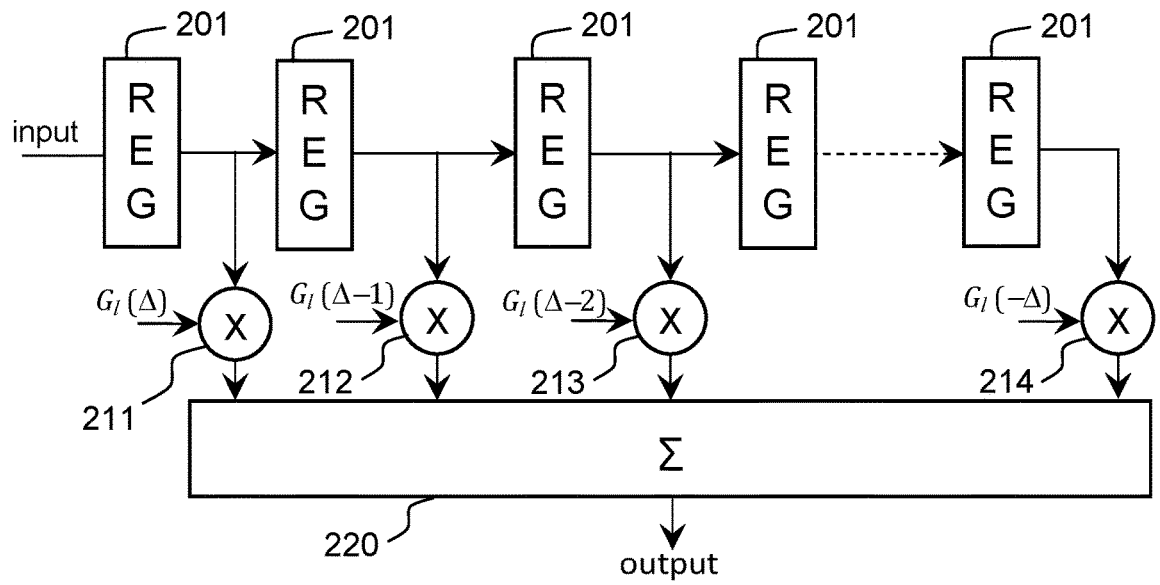
FIGS. 2a and 2b represent various known FIR architecture implementations.

As can be seen in Eq. 4, the P circular convolutions can be implemented through independent FIR filters. A straightforward implementation of Eq. 4 could be done using FIR filter architectures known as "direct-form FIR", as shown in FIG. 2a. In this FIR filter architecture, input samples are delayed by a series of $C_g$ delay registers 201. The delayed input samples are respectively multiplied by coefficients $G_l$ 211 to 214 obtained from the prototype filter. The outputs of the multipliers are summed by summing device 220 to provide one output sample per cycle that corresponds to the output of the circular convolution. This architecture is a direct application of Eq. 4 as the delayed inputs correspond to the term $X_l(m-p)$. However, it is not the most efficient filtering architecture.

Figure 2B:
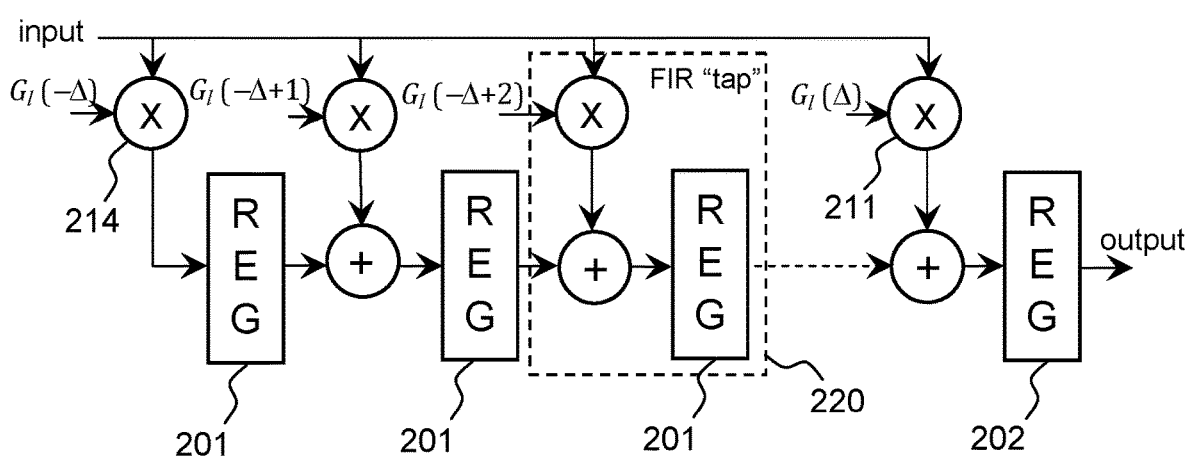

FIG. 2b represents another possible implementation of the FIR of Eq. 4, using a FIR filter architecture known as the "transposed direct FIR" architecture. In this architecture, each input sample is parallely multiplied by coefficients $G_l$ 214 to 211. Once multiplied, the samples are processed by a pipeline of delay registers 201 and adders 231, to provide one output sample per cycle. This architecture is composed of $C_g$ taps 220, a tap being the combination of a multiplier, a delay register, and an adder (except for the first tap where the adder is not relevant). In practice, the last delay register 202 is not implemented, as its only role is to ensure that the direct-form and transposed-direct structures have equal timing. This architecture has the same implementation complexity as the one of the direct form FIR structure, but is more prone to take advantage of design improvements related to the structure of the FBMC/OQAM signal, which are discussed further below.

Some known improvements may be done to both FIR architectures. For instance, as coefficients $G_l$ are of constant values (they only depend on the impulse response of the prototype filter and the index l of the circular convolution considered), multiplier-less FIR architectures can be designed for fixed-point precision that use adders and shifts in place of multipliers. Such multiplier-less FIR architectures require far less hardware resources (logic gates) than regular multipliers, achieving thus an important hardware complexity reduction. Advantageously, as all the multipliers of the transposed direct structure process the same input sample, they can be implemented through a network of constant multipliers, where an important reuse of the adders and shift registers used to replace the multipliers can be achieved, reducing thus significantly the implementation complexity. Tools are known that automatically and efficiently generate such networked multiplier-less FIR structures. The various embodiments of an OS/OSB-FBMC receiver according to the disclosure may therefore advantageously use FIR filters architectures based on the transposed direct structure presented in FIG. 2b to compute the circular convolutions stage.

Some interesting properties of the signal processed by the circular convolutions stage of OS/OSB-FBMC receivers are presented hereafter. These properties are used later on to improve the unit's implementation.

The first property concerns the value of coefficients $G_l$. Sequence $G_l$, used within circular convolution number l, can be expressed as follows:

$$G_l(p) = \sum_{k=0}^{L-1} G(p-m)Z_l(m) \qquad \text{Eq. 5}$$

where $G$ and $Z_l$ are the Fourier transform (of a size L) respectively of the prototype filter impulse response g and of the linear phase rotation $z_l$.

$Z_l$ may be expressed as:

$$Z_l(m) = z_l(0) + z_l(L/2) + \sum_{k=1}^{\frac{L}{2}-1}\left(z_l(k)e^{-i\frac{2\pi km}{L}} + z_l^*(k)e^{i\frac{2\pi km}{L}}\right) \qquad \text{Eq. 6}$$

In the summation of Eq. 6, by definition, $$z_l(k)e^{-i\frac{2\pi km}{L}} + z_l^*(k)e^{i\frac{2\pi km}{L}}$$

and $z_l(L/2)$ are real valued numbers. Therefore, $\Im(Z_l(m)) = \Im(Z_l(0))$, $\Im(.)$ being the imaginary part of a complex number. The imaginary part of $G_l$ becomes:

$$\Im(G_l(p)) = \Im(z_l(0))\sum_{m=0}^{L-1} G(p-m) = \Im(z_l(0))g(0). \qquad \text{Eq. 7}$$

As $g(0)$ corresponds to the first sample of the ramp up part of the impulse response of the prototype filter, it is necessarily close to zero and $g(0)\approx 0$. From Eq. 7, it can then be deduced that $\Im(G_l(p))\approx 0$.

Implementing the circular convolutions stage in an OS/OSB-FBMC receiver may take this property into consideration by only considering the real part of $G_l(p)$ to perform the circular convolutions, reducing thus the implementation cost by a factor two.

The second property concerns some symmetry within the sequences $G_l$.

Indeed, when l=0, Eq. 1 is:

$$G_0(-p) = \left(\sum_{k=0}^{L-1} g(k)e^{-i\frac{2\pi kp}{L}}\right)^* = G_0(p). \qquad \text{Eq. 8}$$

Therefore, a FIR filter having a transposed direct structure and implementing the circular convolution indexed l=0 can be constructed using only $\Delta+1$ multipliers, as except for one tap, the taps can be regrouped by pairs having a same input and a same multiplier coefficient. The multiplication can therefore be performed only once for each pair of taps.

When l>0, $G_l(p)=-G_{P-l}(1-p)$, with $p \in [\![0,\Delta]\!]$. Indeed, the term $-G_{P-l}(1-p)$ can be expressed as:

$$-G_{P-l}(1-p) = -\sum_{k=0}^{L-1} g(k) z_{P-1}(k) e^{-i\frac{2\pi k}{L}} e^{i\frac{2\pi pk}{L}}. \quad \text{Eq. 9}$$

In addition, $$z_{P-1}(k) = -z_l^*(k) e^{i\frac{2\pi k}{L}},$$

and the above equation becomes:

$$-G_{P-l}(1-p) = -\sum_{k=0}^{L-1} g(k) z_l(k)^* e^{i\frac{2\pi pk}{L}}, \quad \text{Eq. 10}$$

which corresponds to the result of the Inverse FFT (of a size L) of the term $g(k)z_l(k)^*$. A known relation between an FFT and an IFFT can be exploited: the effects of conjugating both the inputs and the outputs of an IFFT cancel each other: FFT(x)=IFFT(x*)*. Applying this property to the above equation gives:

$$-G_{P-l}(1-p) = \left(\sum_{k=0}^{L-1} g(k) z_l(k) e^{-i\frac{2\pi pk}{L}}\right)^* = G_l^*(p) = G_l(p) \quad \text{Eq. 11}$$

as $\Im(G_l(p)) \approx 0$.

There is therefore a property of symmetry between the coefficient p of circular convolution $G_l$ and the coefficient (1-p) of circular convolution $G_{P-l}$ which may be exploited during the design of the filters implementing the circular convolutions to reduce the number of multipliers by a factor 2.

Considering that the sequences $G_l$ can be implemented using real operators only and exploiting their symmetry properties, the number of processing required by OS/OSB-FBMC receivers may be decreased drastically. Theoretically, considering a number of coefficients $C_g$=7, the complexity could be divided by at least a factor 4. However, these simplifications are difficult to integrate as such in the receiver, in particular as the simplifications related to the symmetrical property $G_l(p)=-G_{P-l}(1-p)$ require a "crosstalk" between the various circular convolution units. The various embodiments of OS/OSB-FBMC receivers presented hereafter make possible to take advantage of both the transposed direct FIR filter architecture and of the properties of the sequences $G_l$.

Figure 1A:
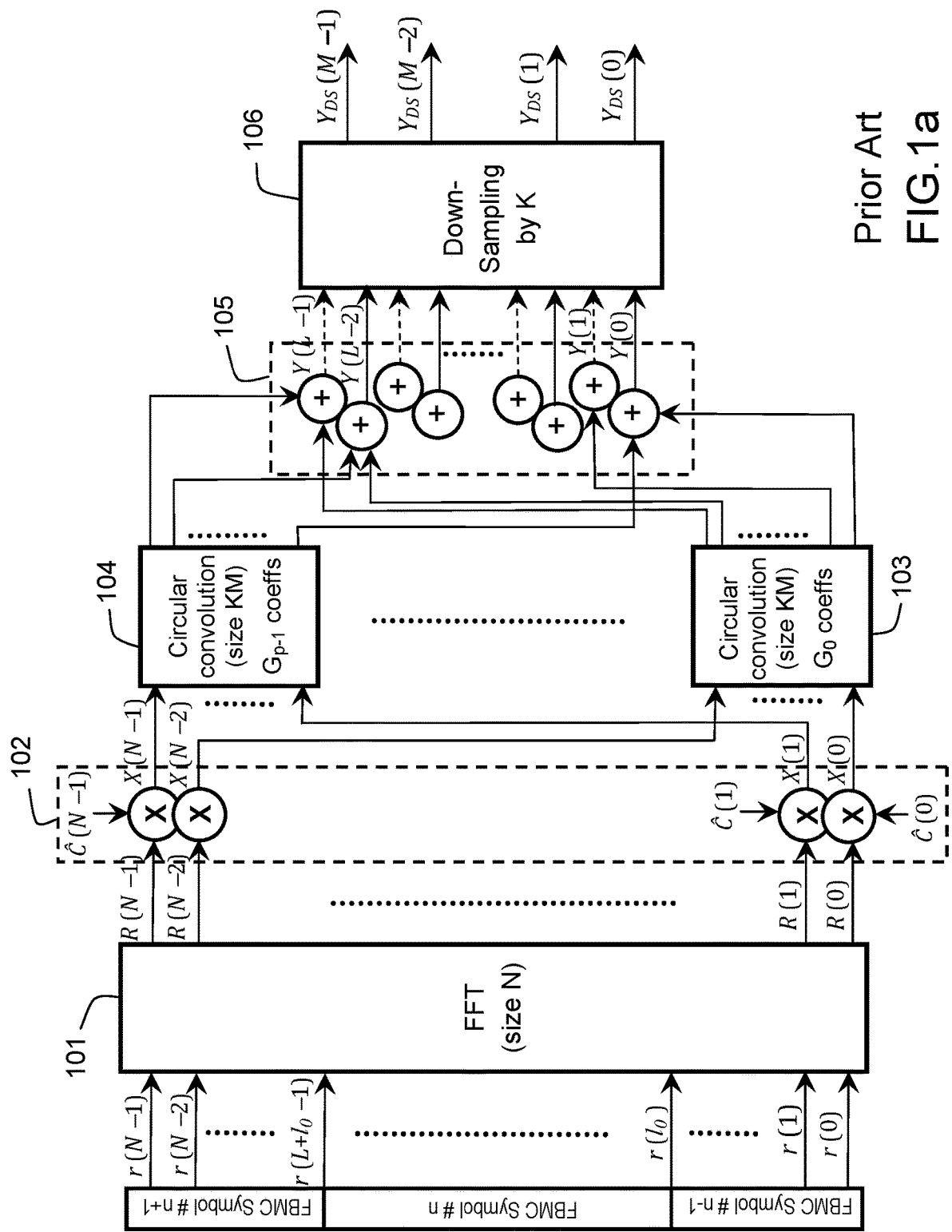
FIGS. 1a to 1c represent various embodiments of an OS/OSB-FBMC receiver as known from the previous art.
Figure 1B:
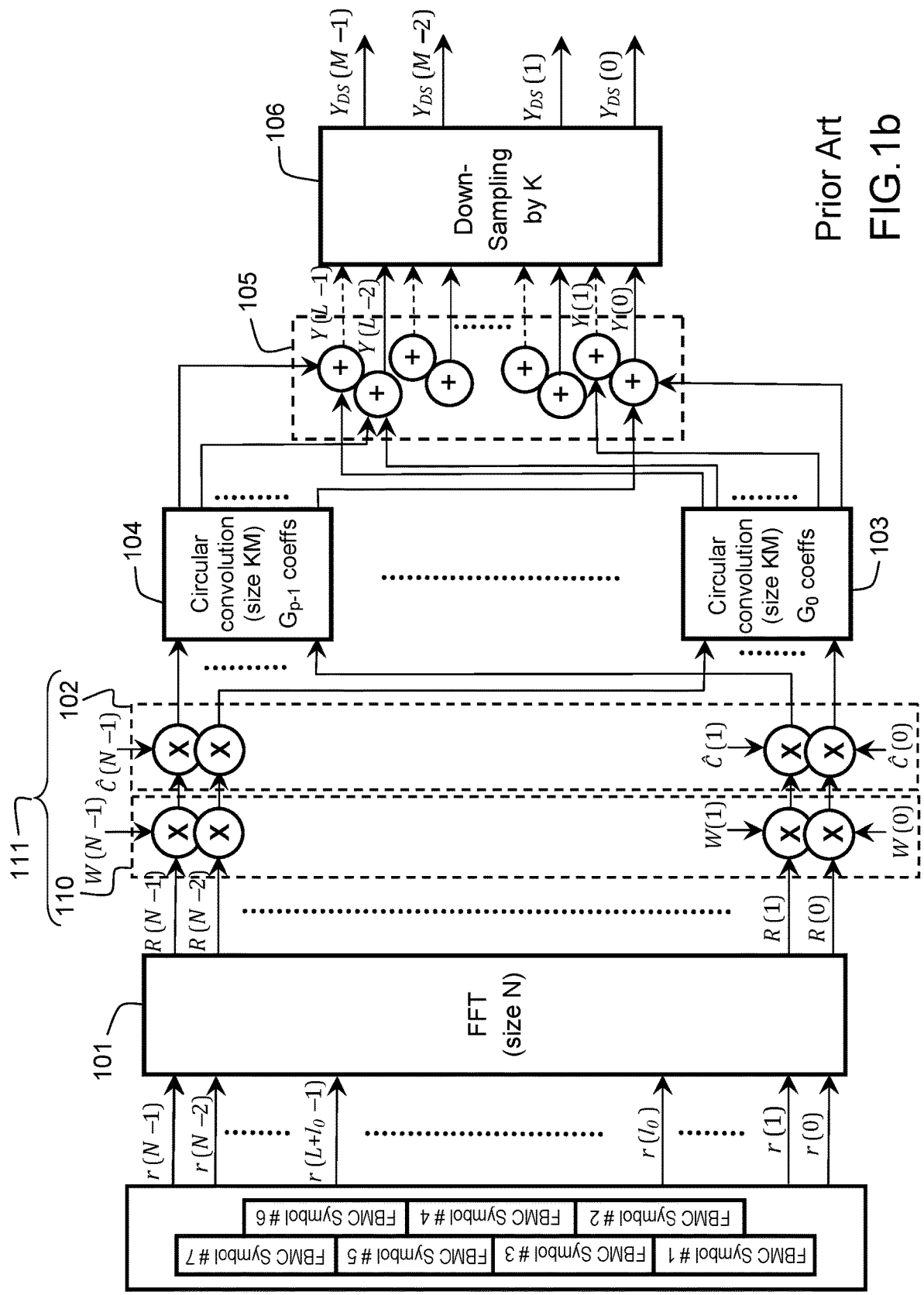
Figure 1C:
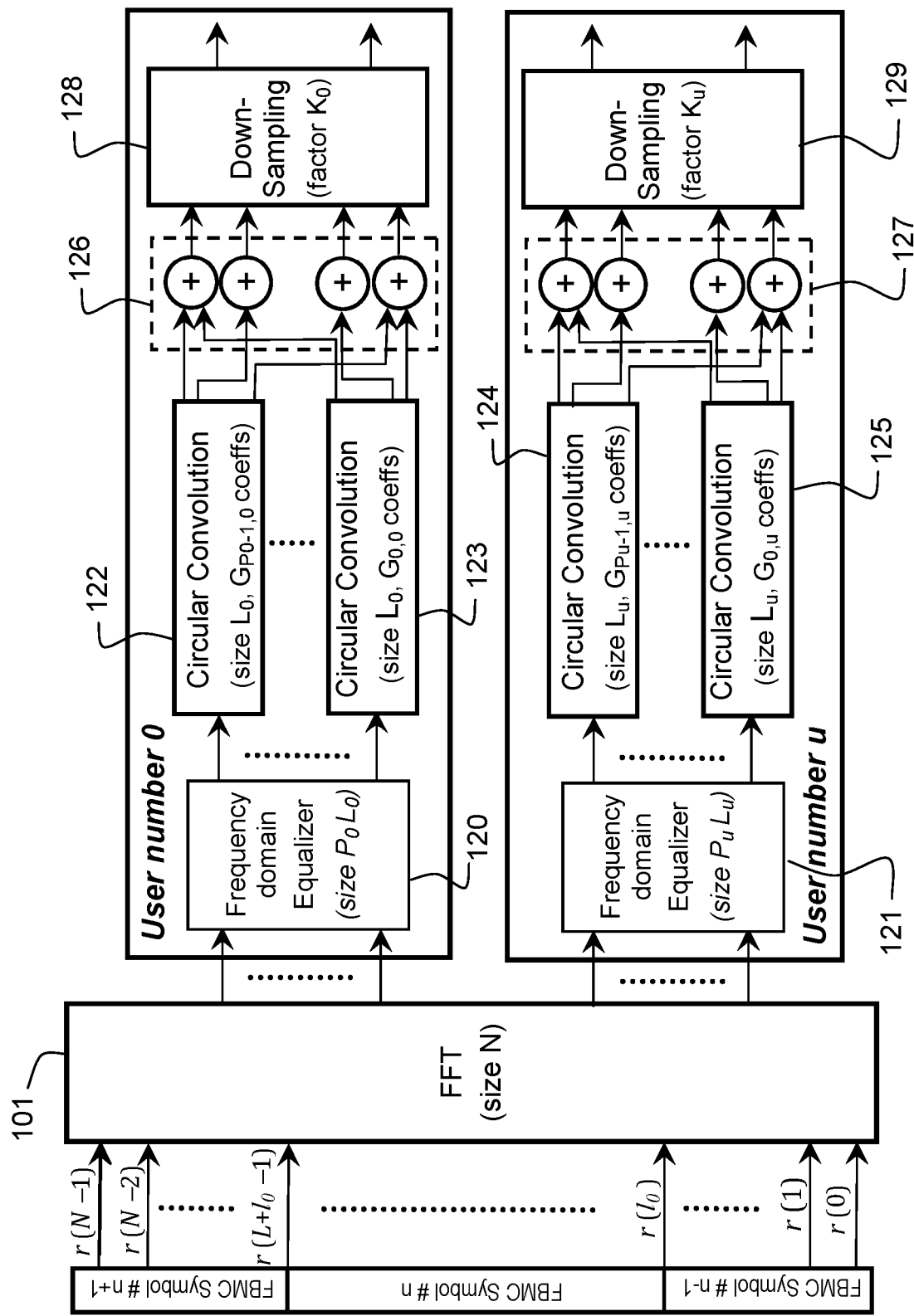
Figure 3A:
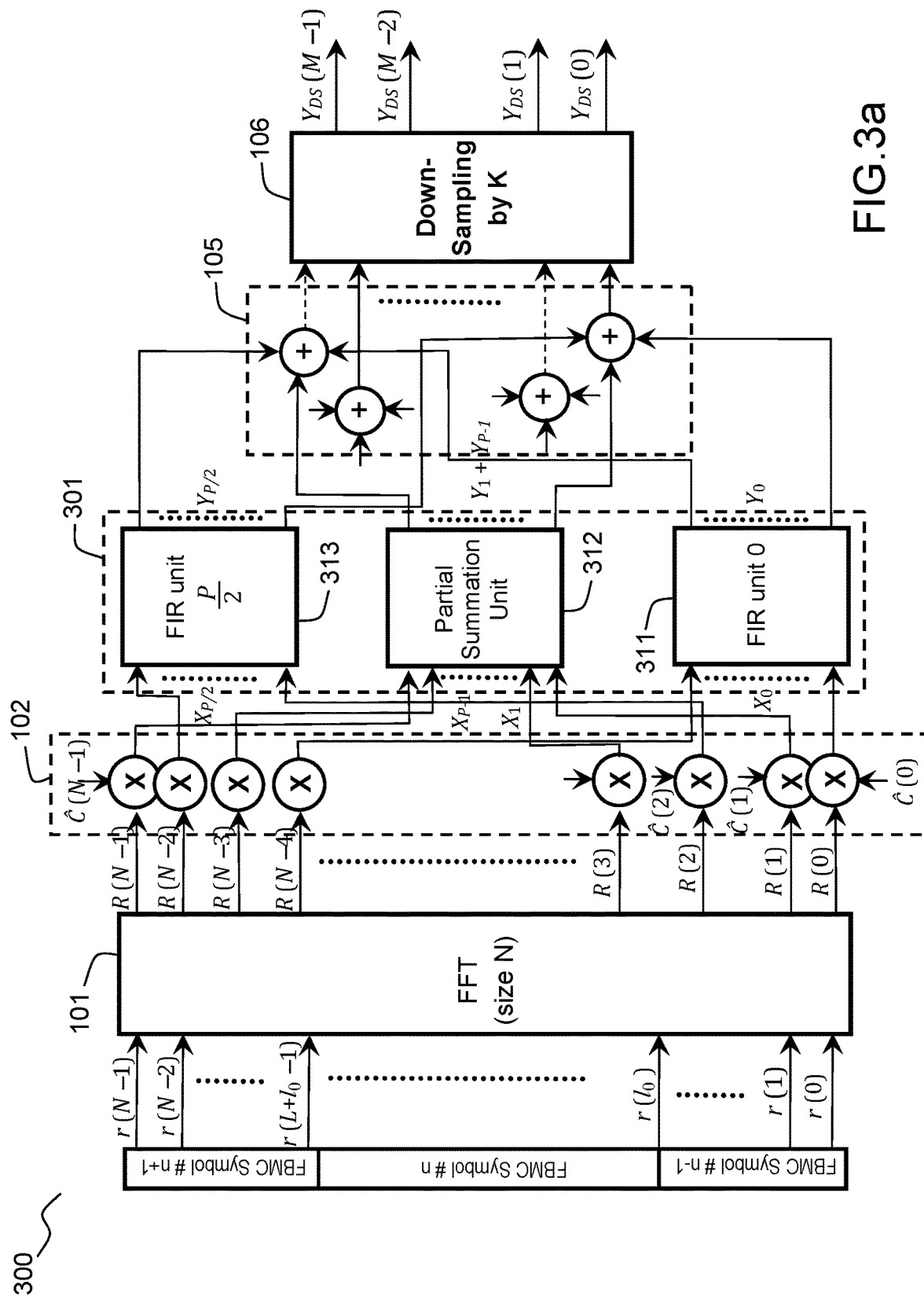
FIG. 3a represents an illustrative embodiment of an OS-FBMC receiver according to the disclosure.

To this end, the disclosure consists in a receiver configured to process an FBMC signal, as represented in FIG. 3a. The FBMC signal comprises FBMC symbols made of data mapped over M subcarriers, oversampled by a factor K, filtered by a prototype filter and transposed in the time-domain, as for instance an OQAM signal modulated by an FS-FBMC transmitter. The FBMC receiver comprises at least:

a frequency domain transposition unit 101, configured to transpose a block of N=P*KM samples comprising at least one FBMC symbol into frequency domain samples, where P is an integer greater than one, as in FIGS. 1a, 1b and 1c. In the illustration example of FIG. 3, P=4;

an equalizer unit 102 configured to multiply said frequency domain samples by N coefficients computed from a propagation channel estimate. The coefficients are estimated over well-known sequences or pilot samples, as it is known from the state of the art;

a circular convolutions stage 301, comprising a plurality of Finite Impulse Response (FIR) filter units 311, 312, 313 configured to perform P circular convolutions between subsets of said equalized samples and a frequency domain response of a frequency shifted version of the prototype filter. The FIR filters as input one or more sets of samples $X_l$ and delivers one or more sets of samples $Y_l$;

adders 105, configured to sum corresponding outputs of each of the FIR filters.

According to one embodiment, the adders are followed by a stage 106 of downsampling the samples by a factor K, when K>1. In that case, the summing stage 105 comprises L=KM adders, each adder having P inputs. The first adder adds together the first value of each of the $Y_l$, the second adder adds together the second value adds together the second value of each of the $Y_l$, and so on.

According to an advantageous embodiment, the summing stage 105 and the downsampling stage 106 may be carried out simultaneously in a common stage. In that case, the adders only sum the samples of $Y_l$ that would not be discarded by a downsampling stage, that is to say M samples out of each set of $Y_l$. In that case, the stage 106 of downsampling the corresponding outputs of summing stage 105 is no longer required.

The FIR filters computing the circular convolutions stage in an FBMC receiver according to the disclosure have an architecture that depends on the index l of the set of samples $X_l$ they process.

First Fir Filter: l=0

The FIR filter unit 311, used to process the set of samples $X_0$ (that is to say samples X(0), X(P), X(2P), . . . , X(P(L-1))), may be implemented in any manner, for instance using the direct-form implementation of FIG. 2a, or the transposed direct implementation of FIG. 2b.

Such a filter has $C_g$ taps, which are symmetrical around the center coefficient. Therefore, multiplier resources may be advantageously shared between pairs of taps.

Figure 3B:
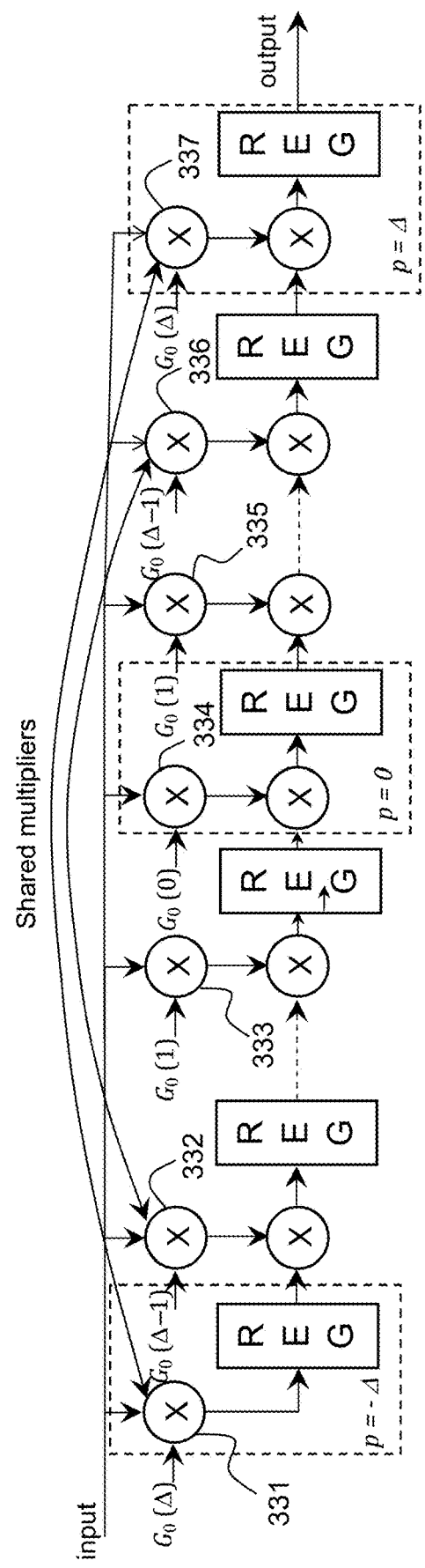
FIG. 3b represents a FIR structure implementing circular convolution indexed 0 in an illustrative embodiment of an OS/OSB-FBMC receiver according to the disclosure.

FIG. 3b represents a FIR structure implementing circular convolution indexed 0 in an illustrative embodiment of an OS/OSB-FBMC receiver according to the disclosure. The FIR is of a direct transposed structure, and multipliers are shared between taps $G_0(p)$ and $G_0(-p)$, with $p \in [\![1,\Delta]\!]$, as for instance for taps 331 and 337, which both implement the multiplier coefficient $G_0(\Delta)$, taps 332 and 336 implementing the multiplier coefficient $G_0(\Delta-1)$, or taps 333 and 335 implementing the multiplier coefficient $G_0(1)$.

As in the transposed direct structure the same sample is input to each tap, two taps sharing a same multiplier coefficient may be implemented by a single multiplier resource, saving thus $C_g-\frac{1}{2}$ multipliers. In addition, using a direct transposed FIR structure makes possible to implement the filter through a network of constant multipliers, as previously described.

Second Fir Filter: l=P/2

When P is even, FIR filter 311 processing the set of samples $X_{P/2}$ may be implemented through a transposed direct filter having $C_g$ multipliers which coefficients are given by $G_{P/2}$, as the FIR filter of FIG. 2*b*. However, this implementation may be further improved.

Indeed, Eq. 11 as demonstrated that $G_{P/2}(p)=-G_{P/2}(1-p)$. In particular, with $$\Delta = \frac{C_g - 1}{2}, G_{P/2}(-\Delta) = -G_{P/2}(\Delta + 1).$$

Since all the coefficients having an index superior to $\Delta$ are considered as non-significant, $G_{P/2}(-\Delta)$ can be set to zero, and one multiplier may be removed from the filter. Therefore, the output of the convolution stage numbered P/2 now becomes:

$$Y_{P/2}(m) = \sum_{p=-\Delta}^{\Delta} G'_{P/2}(p) X_{P/2}(m - p), \quad \text{Eq. 12}$$

with $$G'_{P/2}(p) = \begin{cases} 0, p = -\Delta, \\ -G_{P/2}(1-p), p \in [\![-\Delta+1, 0]\!], \\ G_{P/2}(p), p \in [\![1, \Delta]\!]. \end{cases} \quad \text{Eq. 13}$$

Figure 4A:
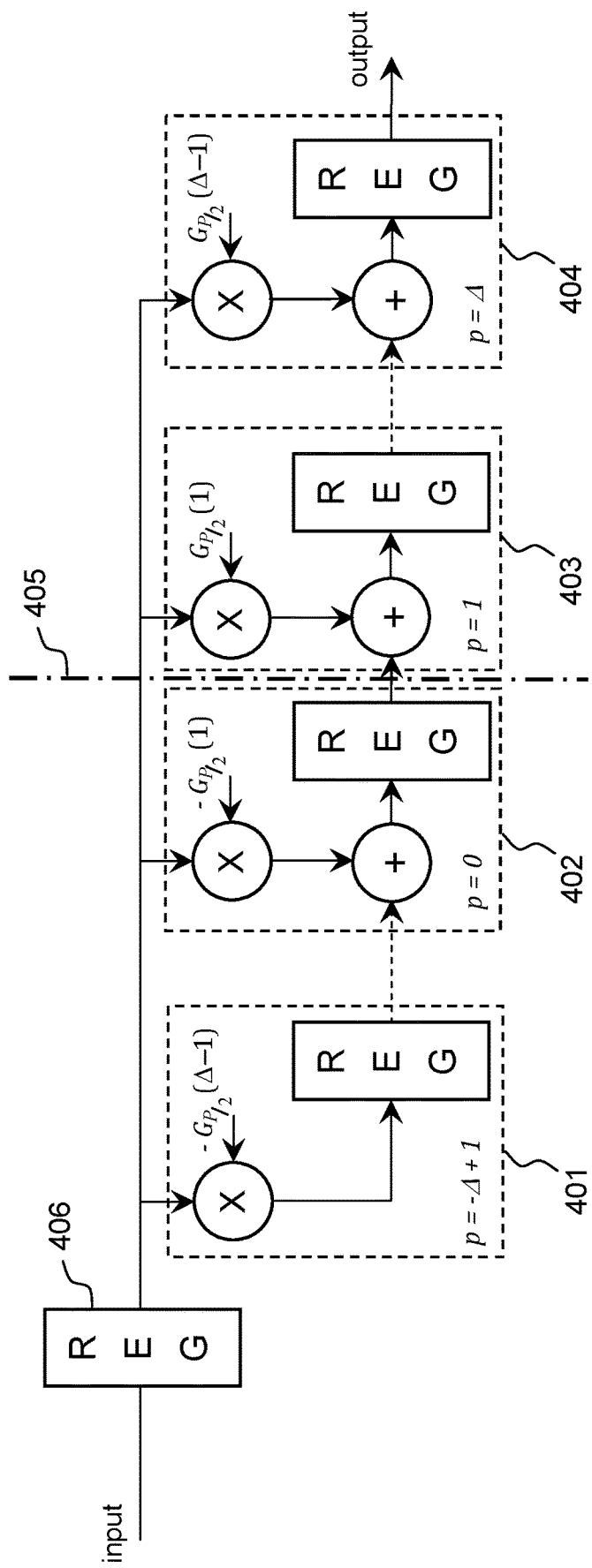
FIGS. 4a to 4c represent various FIR structures implementing circular convolution indexed P/2 in illustrative embodiments of an OS/OSB-FBMC receiver according to the disclosure.

FIG. 4*a* represents a FIR structure implementing the circular convolution indexed P/2 in an exemplary embodiment of an OS/OSB-FBMC receiver according to the disclosure. Depending on the implementation, the FIR filter may comprise $C_g$ taps or $C_g-1$ taps, as the first tap corresponding to $p=-\Delta$ can be removed, as indicated in Eq. 13. Therefore, the FIR filter may be implemented in the form of a FIR filter where the $\Delta$ last taps 403 to 404, corresponding to $p \in [\![1,\Delta]\!]$ in Eq. 13, have multiplier coefficients equal to $G_{P/2}(p)$. The $\Delta$ taps 401 to 402, corresponding to $p \in [\![-\Delta+1,0]\!]$ in Eq. 13, have multiplier coefficients equal to $-G_{P/2}(1-p)$.

By implementing this equation into a transposed direct FIR structure, it appears that the multiplier resources of taps corresponding to $p \in [\![-\Delta+1,0]\!]$ can be shared with the multiplier resources of taps corresponding to $p \in [\![1,\Delta]\!]$ through small adjustments of the filter design, as those sets of coefficients are symmetrical in absolute value around the imaginary axis 405 and have the same input. The number of multipliers of the structure can therefore be reduced by half.

The FIR structure may further comprise an additional shift register 406 configured to delay the input samples by one clock-cycle in order to guarantee an equal processing time in all the filters of the circular convolutions stage. Indeed, the second FIR filter (processing the circular convolution l=P/2) has one tap less than the first FIR filter (processing the circular convolution l=0). Consequently, there will be a difference of one clock-cycle between the moments where the outputs of the filters are available. If this may have no consequence for a software implementation or for a hardware implementation where the processing is chained, this can have one in a hardware implementation where the processing is performed in parallel. However, other methods exist to guarantee the right timing, as for instance inserting the shift register at the output of the second FIR filter, or supervising the timing between the different FIR filters from a dedicated control unit. Therefore, the shift register 406 is only optional and depends on implementation choices.

Figure 4B:
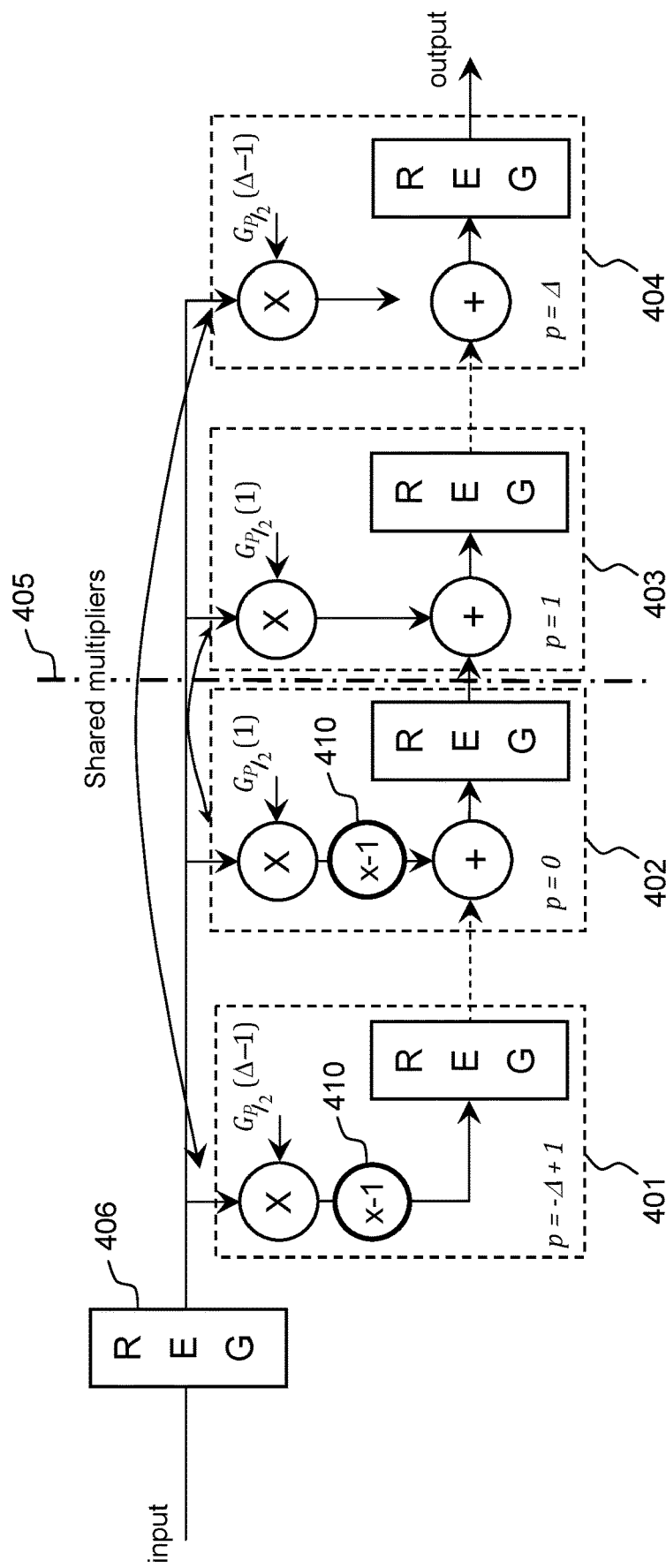

In an advantageous embodiment represented in FIG. 4*b*, a logical inverter 410, or any means configured to change the sign of the output of the multiplier, is added to taps 401 to 402. That way, the coefficients used by the multipliers of taps 401-402 corresponding to $p \in [\![-\Delta+1,0]\!]$ are equal to the multipliers of taps 403-404 (1−p). The multiplier coefficients are then symmetrical around the imaginary axis 405. The resources used to perform the multiplications into these $C_g-1$ taps can therefore be shared by pairs of taps. For instance, in the illustration of FIG. 4*b*, the multipliers of tap 401 and tap 404 having a same input and a same multiplier coefficient $G_{P/2}(\Delta)$ can be implemented through a single multiplier resource.

Figure 4C:
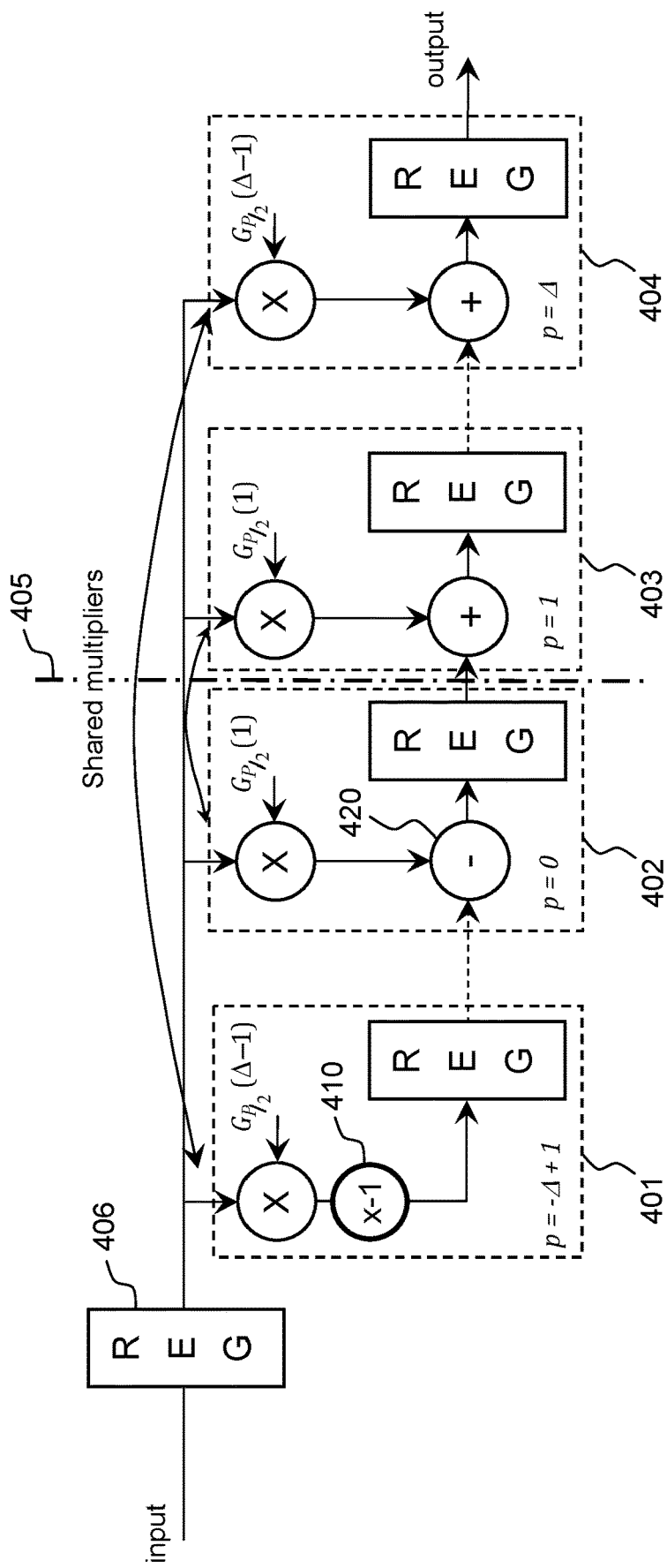

In another advantageous embodiment represented in FIG. 4*c*, an inverter 410 is implemented within the first tap, and subtractors are implemented instead of adders in taps −Δ+2 to 0. The multiplier coefficients are then two by two symmetrical around imaginary axis 405, and can be shared between pairs of taps.

Whereas a straightforward implementation of the circular convolution processing samples $X_{P/2}$ with complex multipliers would have required $4C_g$ multipliers, the FIR structure described in FIG. 4*a* only requires $C_g-1$ real multipliers. Using now the architecture of FIG. 4*b* or 4*c*, where the multipliers are shared and therefore reduced by a factor two, the number of multipliers required to perform this circular convolution is of $$\frac{C_g - 1}{2}.$$

In addition, as all taps of a transposed direct FIR structure input the same sample, the FIR may be implemented using a network of constant value multipliers where the multipliers are implemented through adders and shift registers only and massively shared.

Other Fir Filters

The approach concerning the remaining circular convolutions is different since they are inter-dependent (FIR filter unit processing samples $X_l$ has some symmetry properties with the FIR filter unit processing samples $X_{P-l}$). To efficiently reduce their complexity, a relation between the outputs of the circular convolutions must be exploited, which can be found in the summation stage 105 that follows the circular convolutions stage.

The output of the summation stage 105 Y(m) can be expressed as:

$$Y(m) = \sum_{l=0}^{P-1} Y_l(m) = Y_0(m) + Y_{P/2}(m) + \sum_{l=0}^{\frac{P}{2}-1} Y_l(m) + \sum_{l=\frac{P}{2}+1}^{P-1} Y_l(m). \quad \text{Eq. 14}$$

The first two terms correspond to the output of the first FIR filter (l=0) and the second FIR filter (l=P/2), and have been discussed above. The last term can be rewritten as follows:

$$\sum_{l=\frac{P}{2}+1}^{P-1} Y_l(m) = \sum_{l=1}^{\frac{P}{2}-1} Y_{P-l}(m), \qquad \text{Eq. 15}$$

and the output of the summation stage becomes:

$$Y(m) = \sum_{l=0}^{P-1} Y_l(m) = Y_0(m) + Y_{P/2}(m) + \sum_{l=0}^{P-1}(Y_l(m) + Y_{P-l}(m)). \qquad \text{Eq. 16}$$

In what follows, $Y_l(m)+Y_{P-l}(m)$ is refered as a "partial sum". Partial sum $V_l=Y_l(m)+Y_{P-l}(m)$ sums the outputs of circular convolutions which have some inter-dependent properties, as demonstrated in Eq. 11. $V_l$ can be expressed as follows:

$$V_l(m) = \sum_{p=-\Delta}^{\Delta} G_l(p) X_l(m-p) + \sum_{p=-\Delta}^{\Delta} G_{P-l}(p) X_{P-l}(m-p). \qquad \text{Eq. 17}$$

Since $G_l(-\Delta)=-G_{P-l}(\Delta+1)$, $G_l(-\Delta)$ may be set to zero as all the coefficients having an index superior to $\Delta$ are considered non-significants.

Exploiting the property of symmetry $G_{P-l}(p)=-G_l(1-p)$, the output of the partial sum can be rewritten as:

$$V_l(m) = \sum_{p=-\Delta}^{\Delta} G_l(p) X_l(m-p) - \sum_{p=-\Delta}^{\Delta} G'_l(p) X_{P-l}(m-p). \qquad \text{Eq. 18}$$

with:

$$G'_l(p) = \begin{cases} 0, & p = -\Delta, \\ G_l(1-p), & p \in [\![-\Delta+1, \Delta]\!] \end{cases} \qquad \text{Eq. 19}$$

The above equation can be implemented using two FIR filters, each filter having $C_g$ or $C_g-1$ taps, but such an implementation would not allow the sharing of multipliers, and would therefore be suboptimal.

It would be possible to exploit the properties of symmetry by using one direct-form FIR structure, as the one of FIG. 2a, taking as inputs a combination of $X_l$ and $X_{P-l}$, and using the coefficients $G_l$ as FIR coefficients. This way, the factorization of multipliers would be possible. However, such structure cannot be implemented through a network of constant multiplier, and is therefore not optimal to reduce the complexity related to the multiplications.

Exploiting the symmetrical properties is however more challenging when considering the transposed direct FIR structure. Indeed, the taps of each FIR process the same input but the two FIRs of the partial sum have different inputs ($X_l$ and $X_{P-l}$). Therefore, the networks of constant multipliers only apply to one FIR, and it is not possible to share resources between different FIR filter although they have the same set of coefficients. As there is no symmetrical relation in a given FIR filter, the FIR structure proposed for the convolution stage l=P/2 cannot be applied in this configuration.

The disclosure proposes a solution to this problem. Indeed, it can be shown that resource sharing is possible in the transposed direct FIR structure if the FIR coefficients uses other coefficients than coefficients $G_l$. To this end, Eq. 18 is rewritten as:

$$2V_l(m) = \sum_{p=-\Delta}^{\Delta} (G_l(p) + G'_l(p) + G_l(p) - G'_l(p)) X_l(m-p) - \qquad \text{Eq. 20}$$
$$\sum_{p=-\Delta}^{\Delta} (G'_l(p) + G_l(p) + G'_l(p) - G_l(p)) X_{P-l}(m-p)$$

With $S_l=G_l(p)+G'_l(p)$ and $R_l=G_l(p)-G'_l(p)$, then:

$$2V_l(m) = \sum_{p=-\Delta}^{\Delta} S_l(p)(X_l(m-p) - X_{P-l}(m-p)) + \qquad \text{Eq. 21}$$
$$\sum_{p=-\Delta}^{\Delta} R_l(p)(X_l(m-p) + X_{P-l}(m-p)).$$

The two circular convolutions of Eq. 21 respectively use $S_l$ and $R_l$ as coefficients, and can both be implemented by using a direct-form or transposed direct FIR structure of $C_g$ taps taking respectively $X_l-X_{P-l}$ and $X_l+X_{P-l}$ as input samples. However, the symmetrical relation between $S_l$ and $R_l$ no longer exist: $S_l(p)\neq R_l(p)$ for any $p \in [\![-\Delta+1,\Delta]\!]$. Instead, the symmetrical relation is similar to the one in the convolution stage indexed=P/2. Indeed, $S_l(-\Delta)\approx 0$ since $G_l(-\Delta)=G'_l(-\Delta)=0$, and for $p \in [\![-\Delta+1,\Delta]\!]$:

$$S_l(p)=G_l(p)+G_l(1-p)=S_l(1-p) \qquad \text{Eq. 22}$$

$$R_l(p)=G_l(p)-G_l(1-p)=-R_l(1-p) \qquad \text{Eq. 23}$$

Figure 5:
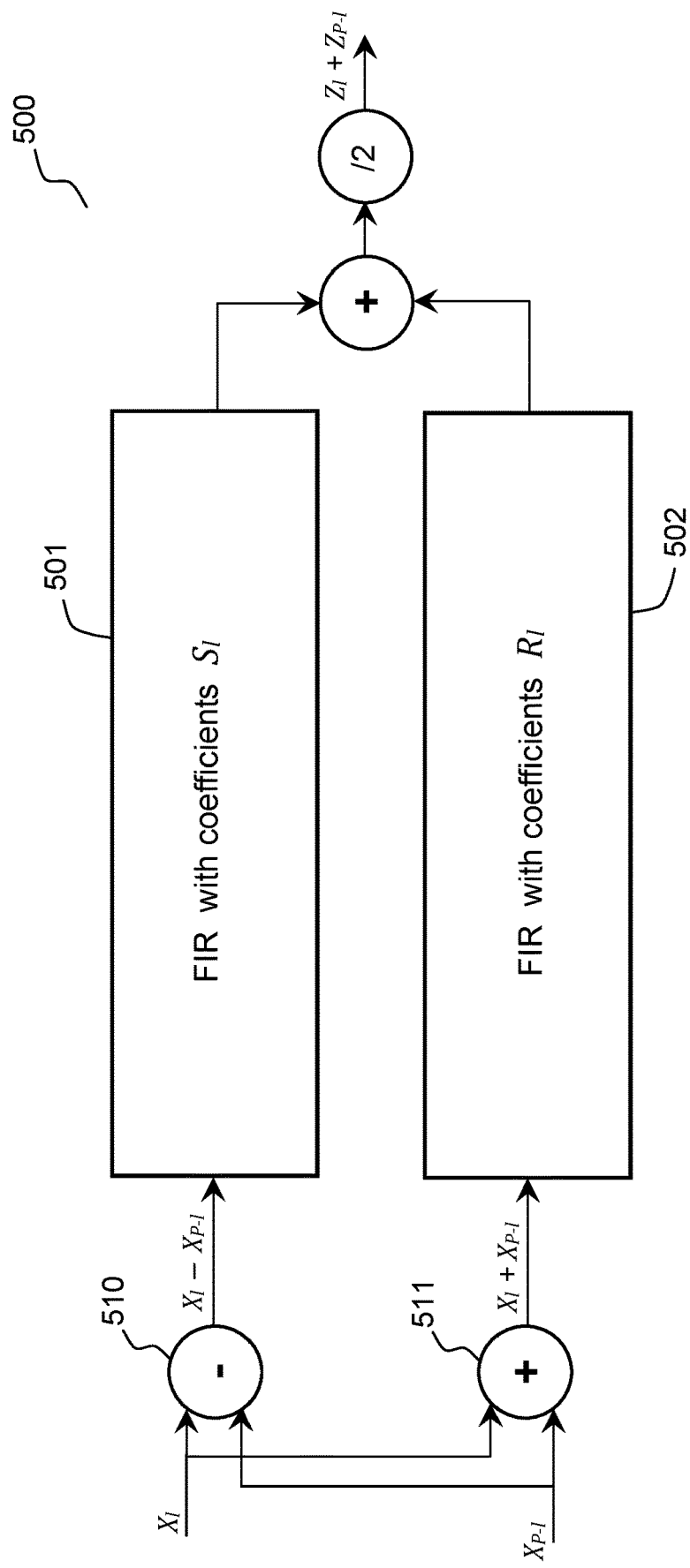
FIG. 5 represents a partial summation unit to be used in an embodiment of an OS/OSB-FBMC receiver according to the disclosure.

FIG. 5 is partial summation unit 500 to be used in an embodiment of an OS/OSB-FBMC receiver according to the disclosure when P>2, used to perform the circular convolutions indexed 1 and (P−1), with $l \in [\![1,P/2-1]\!]$.

In this architecture, a first FIR sub-filter unit 501 having coefficients $S_l$ and a second FIR sub-filter unit 502 having coefficients $Q_l$ are arranged in parallel. One or more calculation units, as for instance subtractor 510 and adder 511, respectively calculate the set of samples $X_l-X_{P-l}$, which is input to the first FIR sub-filter, and $X_l+X_{P-l}$, which is input to the second FIR sub-filter. The output of each FIR sub-filter is connected to an adder, and followed by a factor 2 divider. Such a divider can be efficiently implemented by discarding the least significant bit of the partial sum output, which is a known technique to the skilled engineer.

In the partial summation unit, the properties of symmetry of the second FIR sub-filter 502, having multiplier coefficients $R_l$, are exactly the same as those of the FIR filter implementing circular convolution P/2. The transposed direct FIR architecture of the circular convolution stage indexed P/2, presented in FIGS. 4a to 4c, can therefore be used to implement Eq. 23, only replacing the multiplier coefficients $G_{P/2}$ by $R_l$.

For the first FIR sub-filter 501, having multiplier coefficients $S_l$, the difference with the FIR structure presented in FIGS. 4a to 4c only lies in a sign change. Therefore, the transposed FIR architecture used for the convolution stage index P/2 and presented in FIGS. 4a to 4c can be used if adjusted to:

not invert the sign of the output of the multiplication in the first FIR taps, and use multiplier coefficients $S_l$ instead of $G_{P/2}$.

Figure 6:
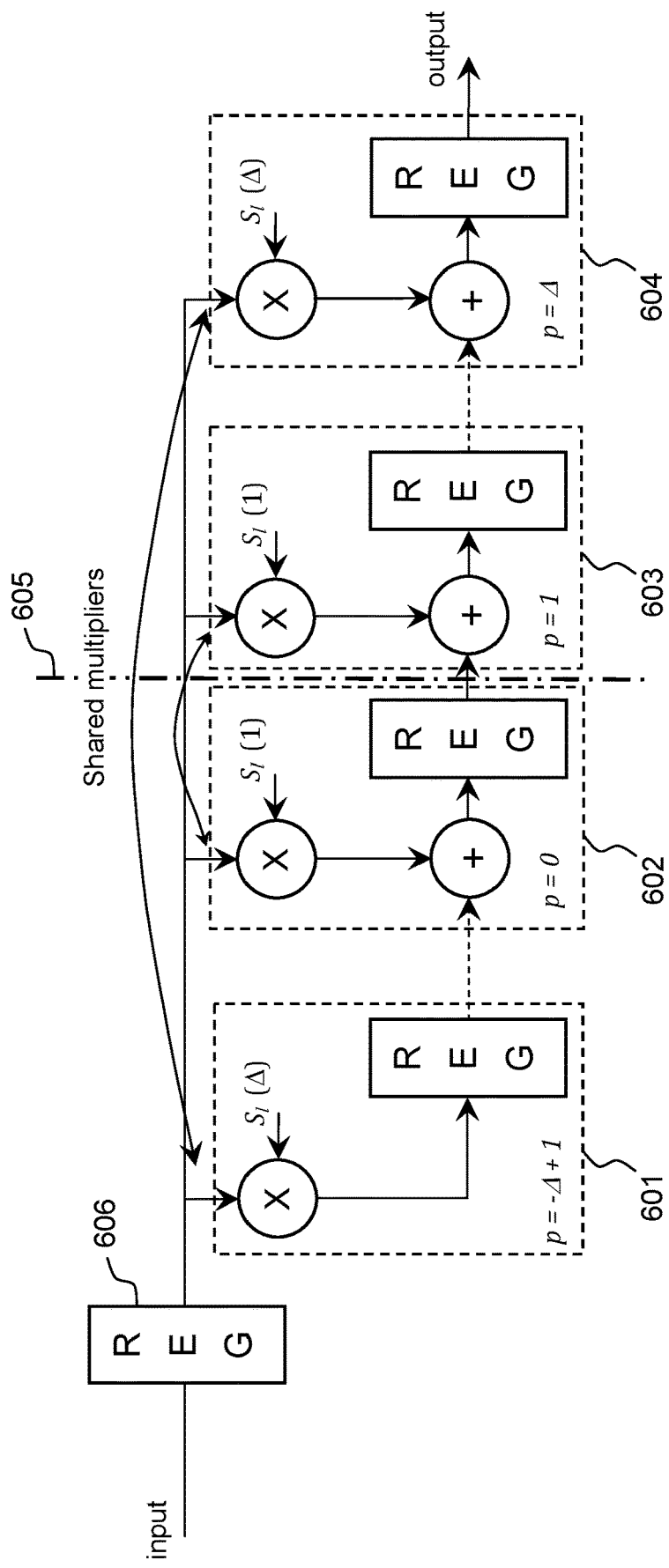
FIG. 6 represents a FIR filter structure to be used as a sub-filter of a partial summation unit in an embodiment of an OS/OSB-FBMC receiver according to the disclosure.

FIG. 6 represents a FIR sub-filter structure that may be used to implement the first FIR sub-filter of a partial summation unit in an embodiment of an OS/OSB-FBMC receiver according to the disclosure, in order to compute the first part of the circular convolution described in Eq. 21.

As for the FIR filters of FIGS. 4a to 4c, the first tap of the filter, corresponding to p=−Δ, can be advantageously removed. Therefore, the first FIR filter may be implemented in the form of a filter having only $C_g-1$ coefficients. However, when relevant, a shift register 606 may be implemented over the input or output samples, so that the filter has the same timing as the other filters of the circular convolutions stage.

The Δ last taps 603 to 604, corresponding to p∈ ⟦1,Δ⟧, have multiplier coefficients equal to $S_l(p)$, while the Δ taps 601 to 602, corresponding to p∈ ⟦−Δ+1,0⟧, have multiplier coefficients equal to $S_l(1-p)$, with $S_l(1-p)=S_l(p)$.

By implementing this equation into a transposed direct FIR structure, it appears that the multiplier resources implemented to compute the taps corresponding to p∈ ⟦−Δ+1,0⟧ can be shared by pairs with those of taps corresponding to (1−p), as they show some symmetry around the imaginary axis 605. The number of multipliers of the structure can therefore be reduced by a factor two.

Obviously, this FIR structure is prone to be implemented considering that the multipliers are real operators, and using a network of constant values multipliers, where the multipliers are implemented through adders and shift registers only, and massively reused.

The partial summation unit according to the invention significantly reduces the implementation complexity of the OS/OSB-FBMC receiver. Indeed, a straightforward implementation of the circular convolutions stage processing the set of samples $X_l$ and $X_{P-l}$ would need two FIR filters, each of them having $C_g$ complex multipliers, for a total cost of $2*4*C_g$ multipliers.

In the partial summation unit according to the disclosure, using the architecture of FIG. 6 to implement the FIR sub-filter having coefficients $P_l$ and the architecture of FIG. 4b or 4c to implement the FIR sub-filter having coefficients $R_l$ and where the multipliers resources are shared by pairs of taps and real, the total cost is of $$\frac{C_g-1}{2} + \frac{C_g-1}{2} = C_g-1$$

multipliers. In addition, as both FIR sub-filters use a transposed direct structure, the multipliers can be implemented by way of networks of constant valued multipliers, where they are replaced by adders and shifters, which is far less expensive to implement.

Figure 7:
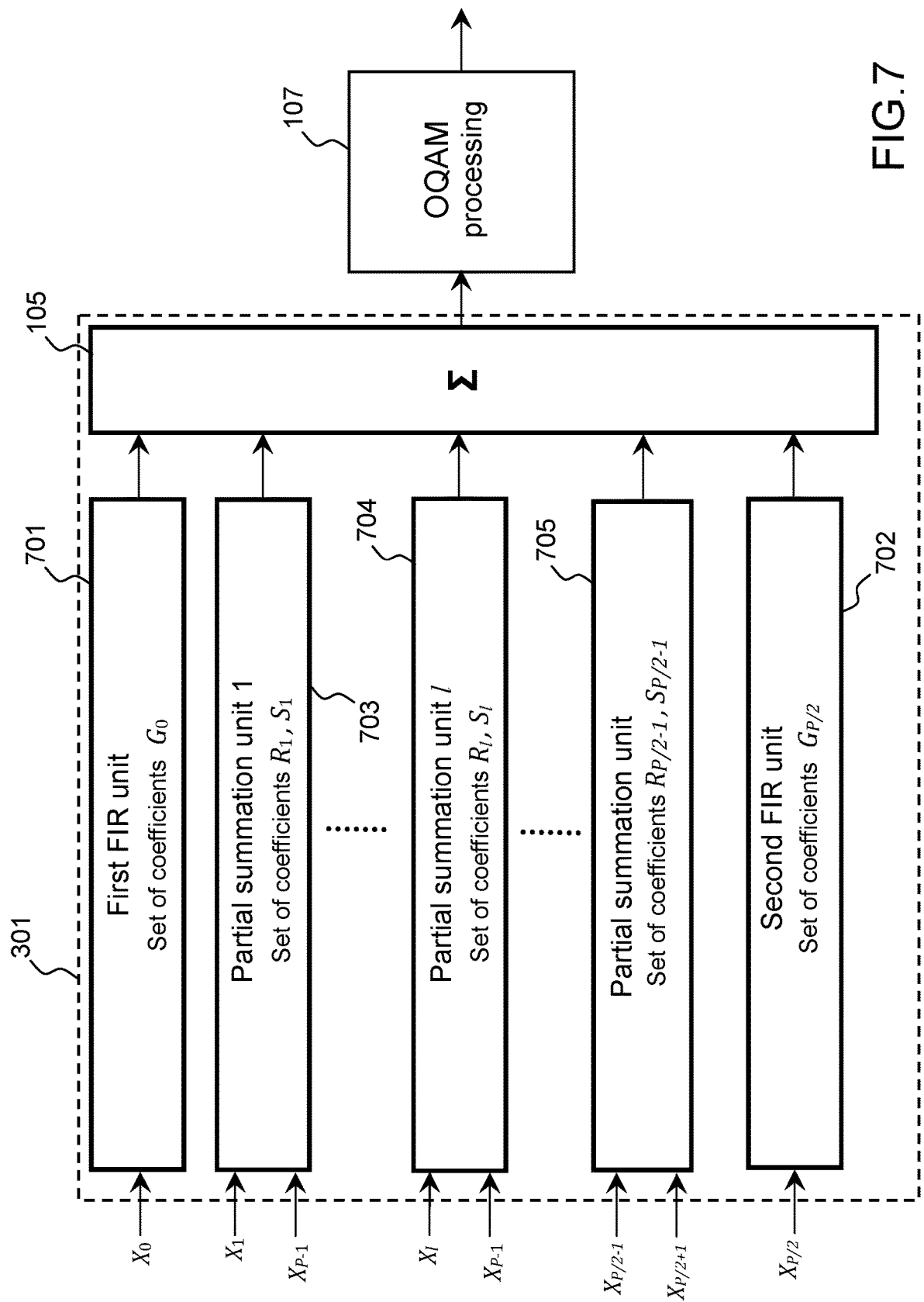
FIG. 7 represents a bench of FIR filters to be used in an embodiment of an OS/OSB-FBMC receiver according to the disclosure.

In brief, in an OS/OSB-FBMC receiver according to the disclosure, the stage of circular convolutions of the receiver is replaced by a bench of FIR filters disposed in parallel. FIG. 7 represents such a bank of FIR filters. It comprises a first FIR filter 701 of a size $C_g$, to process samples $X_0$ through the set of coefficients $G_0$. This FIR filter can be implemented in a transposed direct form only using $$\frac{C_g+1}{2}$$

multiplier resources, as the multiplier coefficients of the taps are symmetrical around the central tap, as shown in FIG. 3b.

When P is even, it also comprises a second FIR filter 702, processing set of samples) $X_{P/2}$. This FIR filter is implemented according to any of the embodiments presented in FIG. 4a to 4c, using the set of multiplier coefficients $G_{P/2}$. This filter is of a size $C_g$ but the first tap can be removed as the value of its multiplier coefficient is about zero. In addition, according to the embodiments of FIGS. 4b to 4c, the multiplier coefficients of the first half of the remaining taps are symmetrical (in absolute value) with the multipliers coefficients of the second half of the remaining taps. As all the taps process the same input sample, the taps can thus be regrouped by pairs of taps using a same multiplier coefficient, and the physical/logical resource implementing the multiplications shared between two taps.

When P=2, the circular convolutions stage of the receiver only comprises these first and second FIR filter units.

When P>2, P being even, the circular convolutions stage of the receiver according to an embodiment of the invention comprises:
  a first FIR filter as of the one of FIG. 3b,
  a second FIR filter as the one of FIGS. 4a to 4c, and
  up to $$\frac{P-2}{2}$$

partial summation units as of partial summation units 703, 704 and 705 of FIG. 7. Each of the partial summation unit takes as input the set of samples $X_l$ and $X_{P-l}$, with l∈ ⟦1,P/2−1⟧, and provides as output a set of samples equal to $Y_l+Y_{P-l}$.

The partial summation units comprise means to calculate the values $X_l+X_{P-l}$ and $X_l-X_{P-l}$, and two FIR sub-filter units, one filtering $X_l-X_{P-l}$ with a set of coefficients $S_l$ with $S_l(p)=G_l(p)+G_l(1-p)$, and one filtering $X_l+X_{P-l}$ with a set of coefficients $R_l$ with $R(p)=G_l(p)-G_l(1-p)$. The outputs of the two sub-filters are summed and divided by two. The two sub-filters have $C_g$ multiplier coefficients, but the first tap of each sub-filter can be removed. In addition, the sub-filter having the coefficients $R_l$ may be implemented according to the embodiments of FIGS. 4b to 4c, while the sub-filter having the coefficients $S_l$ may be implemented according to the embodiment of FIG. 6. Thus, the taps of each of the two sub-filters can be regrouped by pairs of taps sharing a common multiplier resource.

When P>2, P being odd, the circular convolutions stage of the receiver according to an embodiment of the invention comprises:
  a first FIR filter as of the one of FIG. 3b,
  up to $$\frac{P-1}{2}$$

partial summation units, as or partial summation units 703, 704 and 705 of FIG. 7. Each of the partial summation unit takes as input the set of samples $X_l$ and $X_{P-l}$, with l∈ ⟦1,P/2−1⟧, and provides as output a set of samples which is equal to $Y_l+Y_{P-l}$.

Corresponding outputs of the first FIR filter, second FIR filter when relevant, and partial summation units, are summed by adders 105. This stage is followed by a downsampling stage, to downsample the signal by a factor K. However, the stage of adding the outputs and the downsampling stage may advantageously be performed jointly by only adding samples that would not be rejected by the downsampler. The downsampled signal is then processed by an OQAM demapper 107.

The disclosure further concerns a method to perform a stage of circular convolutions in an OS/OSB-FBMC receiver. The stage comprises P circular convolutions operated between subsets of input samples and frequency domain responses of a frequency shifted version of a prototype filter associated to an FBMC modulation, the frequency shifted version of the prototype filter having $C_g$ coefficients. The method comprises at least the filtering of a subset of samples that are input to the circular convolutions stage by a filter having at least $C_g-1$ taps numbered $p=-\Delta+1$ to $p=\Delta$ with $$\Delta = \frac{C_g - 1}{2},$$

wherein the multiplier coefficient of each tap p within the set of taps $[\![-\Delta+1;0]\!]$ has an equal absolute value to the multiplier coefficient of taps (1−p).

According to an embodiment, the method comprises the filtering of a subset of samples $X_0=[X(0),X(0+P), X(2P), \ldots, X((KM-1)P)]$ that are input to the circular convolutions stage by a transposed direct FIR filter having $C_g$ taps numbered $p=-\Delta$ to $p=\Delta$, the multiplier coefficient of each tap p within the set of taps $[\![-\Delta,-1]\!]$ being equal to the multiplier coefficient of tap (−p). This step corresponds to the computation of circular convolution 701 of FIG. 7.

While in a hardware implementation, the choice of a direct form or a transposed direct form to implement the FIR filters implies specific arrangements of the taps (in the transposed direct structure, shift registers are positioned after the multiplication within the taps), in a software implementation, it as consequences on the way data are memorized. In a direct-form FIR structure, samples that are input to the FIR filters are successively stored in memory, while in the transposed-direct FIR structure, that is the output of the multiplications that are successively stored in memory.

According to various embodiments of the invention, the method may comprise:
- a step of filtering of a subset of samples $X_{P/2}=[X(P/2),X(P/2+P),X(P/2+2P), \ldots, X(P/2+(KM-1)P)]$ that are input to the circular convolutions stage by a transposed direct FIR filter having at least $C_g-1$ taps numbered $p=-\Delta+1$ to $p=\Delta$, the multiplier coefficient of each tap p within the set of taps $[\![-\Delta+1;0]\!]$ having an opposite value to the multiplier coefficient of tap (1−p). This step occurs when an integer P corresponding to a number of circular convolution to operate in the convolution stage, is even. This step corresponds to the computation of circular convolution 702 of FIG. 7;
- a step of filtering a first and a second subset of samples that are input to the circular convolutions stage ($X_l=[X(l),X(l+P), X(l+2P), \ldots, X(l+(KM-1)P)]$ and $X_{P-l}=[X(P-l), X(P-l+P), X(P-l+2P), \ldots, X(P-l+(KM-1)P)]$) by two transposed direct FIR filter, which comprises:
  - calculating a set of samples equal to $X_l-X_{P-l}$ and a set of samples equal to $X_l+X_{P-l}$,
  - filtering the set of samples $X_l-X_{P-l}$ with a first FIR sub-filter having at least $C_g-1$ taps numbered $p=-\Delta+1$ to $p=\Delta$ taking as input samples corresponding to the set of samples $X_l-X_{P-l}$, wherein the multiplier coefficient of each tap p within the set of taps $[\![-\Delta+1;0]\!]$ has an equal value to the multiplier coefficient of tap (1−p),
  - filtering the set of samples $X_l+X_{P-l}$ with a second FIR sub-filter having at least $C_g-1$ taps numbered $p=-\Delta+1$ to $p=\Delta$ taking as input samples $X_l+X_{P-l}$, wherein the multiplier coefficient of each tap p within the set of taps $[\![-\Delta+1;0]\!]$ has an opposite value to the multiplier coefficient of tap (1−p), and
  - calculating the sum of corresponding outputs of the first and second FIR sub-filters, and dividing the result by a factor two.

This step corresponds to the partial summation 703 to 705 of FIG. 7, and is performed a number of times corresponding to P−2/2 when P is even, or P−½ when P is odd.

The disclosure also concerns a method to demodulate and equalize an FBMC signal in a receiver, the method comprising at least a step of performing a stage of circular convolutions as described here above.

The OS/OSB-FBMC receiver according to the disclosure may be embedded in a receiver having an RF chain in charge of receiving an FBMC signal over one or more antennas, and converting the signal to an intermediate frequency or to baseband. The signal is then processed by an OS/OSB-FBMC receiver according to the disclosure, and transmitted to a unit in charge of computing the subsequent algorithms required to receive the data transmitted, as for instance the OQAM demapping, error decoding, and/or the functions of the OSI layers located above the PHY layer. The OS/OSB-FBMC receiver according to the disclosure is compatible with the embodiment of FIG. 1c, wherein subcarriers are allocated to multiple users. In that case, the stage of FIR filtering 301 according to the disclosure may be implemented for each user.

The OS/OSB-FBMC receiver according to the disclosure may also be embedded in a standalone device configured to take as input an intermediate frequency or baseband signal, and to provide an equalized and demodulated signal to another reception device, in charge of the subsequent algorithms.

The disclosure concerns both a unit performing a stage of circular convolutions, an equalization and demodulation unit comprising the stage of circular convolutions, and an OS/OSB-FBMC receiver as a whole.

The implementation improvements disclosed in the OS/OSB-FBMC receiver according to the disclosure is particularly well adapted for an hardware implementation over a hardware platform like a FPGA, or an ASIC, wherein the multipliers units shared in a FIR filter/sub-filter are dedicated hardware units and parallelized. However, the various improvements described may also be used to generate an efficient software implementation of a method for receiving an FBMC signal over a software reprogrammable calculation machine, like a microprocessor, a microcontroller, a DSP, or a graphic processing unit (GPU), or any other appropriate equipment, wherein the software code takes into account the structure of the FIR filters/sub-filters, in particular the shared multiplier resources, to reduce the number of operations required to compute the software FIR filtering. In that case, the shared multiplication resource corresponds to a single calculation, which output is used two compute two corresponding taps of the FIR filter/sub-filter.

The OS/OSB-FBMC receiver according to the disclosure may therefore be implemented by means of computer-application programs or services, as an application-programming interface (API), a library, and/or other computer-program product, or any combination of such entities.

The subject matter of the present disclosure includes all novel and non-obvious combinations and sub-combinations of the various processes, systems and configurations, and other features, functions, acts, and/or properties disclosed herein, as well as any and all equivalents thereof. In particular, it includes all OS/OSB-FBMC receiver mixing FIR filters as described previously with regular FIR filters, as for instance a circular convolutions stage 301 for P=2 comprising a FIR unit as described in FIGS. 4a to 4c processing the set of samples $X_{P/2}$, and a direct form FIR unit processing the set of samples $X_0$. Such an implementation would be obvious for the skilled person seeking to circumvent the protection sought in view of the above description.

It would also be obvious for the skilled person based on the current disclosure to add extra taps to the FIR filters implementing the circular convolutions stage, as for instance the stage corresponding to tap p=Δ which, as it was demonstrated above, can be advantageously removed.

While embodiments of the invention have been illustrated by a description of various examples, and while these embodiments have been described in considerable details, it is not the intent of the applicant to restrict or in any way limit the scope of the appended claims to such details. The invention in its broader aspects is therefore not limited to the specific details, representative methods, and illustrative examples shown and described.

The invention claimed is:

1. A device configured to perform a stage of circular convolutions in an Overlap-Save Filtered-Bank MultiCarrier (OS-FBMC) or Overlap-Save-Block FBMC (OSB-FBMC) receiver, the stage of circular convolutions performing P circular convolutions between subsets of input samples and frequency domain responses of frequency shifted versions of a prototype filter associated to a Filtered-Bank Multicarrier (FBMC) modulation having $C_g$ coefficients, said input samples being designated as [X(0) ... X(KMP−1)] with M a number of subcarriers, K an oversampling factor of the FBMC modulation applied to a FBMC signal received by the receiver and P an integer greater than one, wherein the stage of circular convolutions comprises:
a first Finite Impulse Response (FIR) filter implemented in the form of a transposed direct filter having $C_g$ taps numbered p=−Δ to p=Δ with Δ=($c_g$−1)/2, a multiplier coefficient of each tap p within the set of taps 〚 −Δ+1; 0 〛 having an equal value to a corresponding multiplier coefficient of tap (−p), and taking as input a subset $X_0$=[X(0), X(P), X(2P), . . . , X((KM−1)P)] of said input samples;
at least one Finite Impulse Response (FIR) filter, each of said at least one FIR filter being implemented in the form of a transposed direct filter having at least $C_g$−1 taps numbered p=−Δ+1 to p=Δ with $$\Delta = \frac{C_g - 1}{2},$$

a multiplier coefficient of each tap p within the set of taps 〚 −Δ+1; 0 〛 having an equal absolute value to a corresponding multiplier coefficient of tap (1−p), and taking as input a subset or a combination of subsets of said input samples; the multiplier coefficients of the first FIR filter and of the at least one FIR filter being based on said frequency domain responses of frequency shifted versions of the prototype filter associated to the FBMC modulation.

2. The device of claim 1, where P is even, and where the at least one FIR filter comprises a second FIR filter implemented in the form of a transposed direct filter having at least $C_g$−1 taps numbered p=−Δ+1 to p=Δ,
the second FIR filter taking as input the subset of input samples XP/2=[X(P/2), X(P/2+P), X(P/2+2P), . . . , X(P/2+(KM−1)P)], the multiplier coefficient of each tap p within the set of taps having an opposite value to the multiplier coefficient of tap (1−p).

3. The device of claim 2, wherein the coefficients of the first and second FIR filters are the $C_g$ significant coefficients of:

$$G_l(p) = \sum_{k=0}^{L-1} g(k)z_l(k)e^{-i\frac{2\pi pk}{L}},$$

where g is the time domain response of the prototype filter and $$z_l(k) = e^{j\frac{2\pi l(k-L/2)}{P}},$$

0 for the first FIR filter, and l=P/2 for the second FIR filter.

4. The device of claim 2, wherein each pair of taps having equal absolute values in the said second FIR filter is implemented by a single multiplier.

5. The device of claim 4, wherein each of said pair of taps having equal absolute values implemented by a single multiplier and having multipliers coefficients of opposite values comprise means to invert the sign of an output of the said single multiplier.

6. The device according to claim 2, wherein multiplier coefficients of the said second FIR filter are real and implemented in the form of a network of constant multipliers.

7. The device according to claim 1, wherein the at least one FIR filter comprises a partial summation unit configured to take as input subsets $X_l$ and $X_{P-l}$ of said input samples, with $X_l$=[X(l), X(l+P),X(l+2P), . . . ,X(l+(KM−1)P)] and $X_{P-l}$=[X(P−l), X(P−l+P), X(P−l+2P), . . . ,X(P−l+(KM−1)P)], l∈ 〚 1,P/2−1 〛, the partial summation unit comprising:
one or more calculation unit configured to calculate a first set of samples equal to $X_l - X_{P-l}$ and a second set of samples equal to $X_l + X_{P-l}$,
a first FIR sub-filter implemented in the form of a transposed direct filter having at least $C_g$−1 taps numbered p=−Δ+1 to p=Δ taking as input the first set of samples, the multiplier coefficient of each tap p within the set of taps 〚 −Δ+1; 0 〛 having an equal value to the multiplier coefficient of tap (1−p),
a second FIR sub-filter implemented in the form of a transposed direct filter having at least $C_g$−1 taps numbered p=−Δ+1 to p=Δ taking as input the second set of samples, the multiplier coefficient of each tap p within the set of taps 〚 −Δ+1; 0 〛 having an opposite value to the multiplier coefficient of tap (1−p), and a calculation unit configured to sum and divide by a factor two corresponding outputs of the first and second FIR sub-filters.

8. The device of claim 7, wherein the coefficients of the first FIR sub-filter are the $C_g$ significant coefficients of $R_l(p)=G_l(p)+Gl(1-p)$, with:

$$G_l(p) = \sum_{k=0}^{L-1} g(k) z_l(k) e^{-j\frac{2\pi pk}{L}},$$

and where g is the time domain response of the prototype filter and $$z_l(k) = e^{j\frac{2\pi l(k-L/2)}{P}},$$

and wherein the coefficients of the second FIR sub-filter are the $C_g$ significant coefficients of $S_l(p)=G_l(p)-G_l(1-p)$.

9. The device of claim 7, comprising $$\frac{P-2}{2}$$

partial summation units when P is even, or $$\frac{P-1}{2}$$

partial summation units when P is odd.

10. The device of claim 7, wherein each pair of taps having equal absolute values in the said first FIR sub-filter is implemented by a single multiplier, and wherein each pair of taps having equal absolute values in the said second FIR sub-filter is implemented by a single multiplier.

11. The device of claim 10, wherein each of said pair of taps having equal absolute values implemented by a single multiplier and having multipliers coefficients of opposite values comprise means to invert the sign of an output of the said single multiplier.

12. The device according to claim 7, wherein multiplier coefficients of the said first FIR sub-filter are real and implemented in the form of a network of constant multipliers, and wherein multiplier coefficients of the said second FIR sub-filter are real and implemented in the form of a network of constant multipliers.

13. The device of claim 1, wherein each pair of taps having equal absolute values in the said first FIR filter is implemented by a single multiplier.

14. The device of claim 13, wherein each of said pair of taps having equal absolute values implemented by a single multiplier and having multipliers coefficients of opposite values comprise means to invert the sign of an output of the said single multiplier.

15. The device according to claim 2, wherein multiplier coefficients of the said first FIR filter, and of the said second FIR filter are real and implemented in the form of a network of constant multipliers.

16. An FBMC equalization and demodulation unit configured to process an FBMC signal comprising FBMC symbols, each FBMC symbol comprising data mapped over M subcarriers, oversampled by a factor K, filtered by a prototype filter and transposed in the time-domain, the FBMC equalization and demodulation unit comprising:

a frequency domain transposition unit, configured to transpose a block of P*KM samples comprising at least one FBMC symbol into frequency domain samples, where P is an integer greater than one, an equalizer unit configured to output a set of equalized samples X by multiplying said frequency domain samples by coefficients computed from a propagation channel estimate, a device as of claim 1 configured to perform the stage of circular convolutions and taking as input samples the set equalized samples X, and adders, configured to sum outputs of said device.

17. An FBMC receiver comprising an FBMC equalization and demodulation unit as of claim 16.

18. A method to perform P circular convolutions in an Overlap-Save Filtered-Bank MultiCarrier (OS-FBMC) or Overlap-Save-Block FBMC (OSB-FBMC) receiver between subsets of input samples and frequency domain responses of frequency shifted versions of a prototype filter associated to a Filtered-Bank Multicarrier (FBMC) modulation having $C_g$ coefficients, said input samples being designated as [X(0) ... X(KMP−1)] with M a number of subcarriers, K an oversampling factor of a FBMC modulation applied to a FBMC signal received by the receiver and P an integer greater than one, the method comprising the steps of:

filtering a subset Xo=[X(0),X(P),X(2P), ... ,X((KM−1)P)] of said input samples by a first Finite Impulse Response (FIR) filter implemented in the form of a transposed direct filter having $C_g$ taps numbered p=−Δ to p=Δ with Δ=($c_g$−1)/2, the multiplier coefficient of each tap p within the set of taps 〚−Δ+1; 0〛 having an equal value to a corresponding multiplier coefficient of tap (−p);

filtering a subset or a combination of subsets of said input samples by at least one FIR filter implemented in the form of a transposed direct FIR filter having at least $C_g$−1 taps numbered p=−Δ+1 to p=Δ with $$\Delta = \frac{C_g - 1}{2},$$

a multiplier coefficient of each tap p within the set of taps 〚−Δ+1; 0〛 having an equal absolute value to a corresponding multiplier coefficient of taps (1−p), the coefficients of the first FIR filter and of the at least one FIR filter being based on said frequency domain responses of frequency shifted versions of the prototype filter associated to the FBMC modulation.

19. A non-transitory computer readable storage medium on which is stored a computer program adapted to implement the method of claim 18.

* * * * *

UNITED STATES PATENT AND TRADEMARK OFFICE
CERTIFICATE OF CORRECTION

PATENT NO. : 12,081,374 B2
APPLICATION NO. : 17/917909
DATED : September 3, 2024
INVENTOR(S) : Jérémy Nadal et al.

Page 1 of 1

It is certified that error appears in the above-identified patent and that said Letters Patent is hereby corrected as shown below:

In the Claims

In Claim 1, Column 21, Line 48, "within the set of taps $[-\Delta + 1; 0]$ having an equal" should be -- within the set of taps $[-\Delta; -1]$ having an equal --.

In Claim 3, Column 22, Line 28, ", 0 for the first FIR filter," should be -- , with $l = 0$ for the first FIR filter, --.

In Claim 18, Column 24, Line 35, "within the set of taps $[-\Delta + 1; 0]$ having an equal" should be -- within the set of taps $[-\Delta; -1]$ having an equal --.

Signed and Sealed this
Twenty-ninth Day of October, 2024

Katherine Kelly Vidal
*Director of the United States Patent and Trademark Office*